US012695902B2

(12) United States Patent
Li et al.

(10) Patent No.: US 12,695,902 B2
(45) Date of Patent: Jul. 28, 2026

(54) LOCAL ILLUMINATION COMPENSATION

(71) Applicant: Alibaba (China) Co., Ltd., Hangzhou (CN)

(72) Inventors: Xinwei Li, Beijing (CN); Ru-ling Liao, Sunnyvale, CA (US); Jie Chen, Beijing (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/895,032

(22) Filed: Sep. 24, 2024

(65) Prior Publication Data

US 2025/0113052 A1 Apr. 3, 2025

Related U.S. Application Data

(60) Provisional application No. 63/587,169, filed on Oct. 2, 2023.

(51) Int. Cl.
H04N 19/513 (2014.01)
H04N 19/105 (2014.01)
(Continued)

(52) U.S. Cl.
CPC ......... H04N 19/521 (2014.11); H04N 19/105 (2014.11); H04N 19/109 (2014.11);
(Continued)

(58) Field of Classification Search
CPC .. H04N 19/521; H04N 19/105; H04N 19/109; H04N 19/119; H04N 19/167;
(Continued)

(56) References Cited

U.S. PATENT DOCUMENTS

2022/0159277 A1*  5/2022  Urban .................. H04N 19/176
2023/0224474 A1   7/2023  Chen et al.
(Continued)

FOREIGN PATENT DOCUMENTS

CN       111031319 A    4/2020
WO       2023093863 A1  6/2023
WO       2023117861 A1  6/2023

OTHER PUBLICATIONS

"Requirements for a Future Video Coding Standard v5," International Organisation for Standardisation, Torino, IT, 14 pages (2017).
(Continued)

*Primary Examiner* — Nasim N Nirjhar
(74) *Attorney, Agent, or Firm* — Finnegan, Henderson, Farabow, Garrett & Dunner, LLP

(57) ABSTRACT

Methods are provided for optical flow-based motion refinement. An exemplary method includes: receiving a bitstream; and decoding, using coded information of the bitstream, one or more pictures, wherein the decoding includes: determining whether a current block is coded by partitioning into multiple parts; and in response to the current block being partitioned into multiple parts that are inter predicted according to respective reference blocks, determining whether to apply a local illumination compensation (LIC) process to the multiple parts based on whether a coded block applies the LIC process.

20 Claims, 25 Drawing Sheets

(51) Int. Cl.

| | | |
|---|---|---|
| *H04N 19/109* | (2014.01) | |
| *H04N 19/119* | (2014.01) | |
| *H04N 19/167* | (2014.01) | |
| *H04N 19/196* | (2014.01) | |

(52) U.S. Cl.
CPC ......... *H04N 19/119* (2014.11); *H04N 19/167* (2014.11); *H04N 19/196* (2014.11)

(58) Field of Classification Search
CPC .. H04N 19/196; H04N 19/117; H04N 19/176; H04N 19/577; H04N 19/583
See application file for complete search history.

(56) References Cited

U.S. PATENT DOCUMENTS

| | | | | |
|---|---|---|---|---|
| 2023/0396780 | A1* | 12/2023 | Wang ..................... | H04N 19/70 |
| 2024/0406410 | A1* | 12/2024 | Kim ..................... | H04N 19/119 |
| 2025/0193411 | A1* | 6/2025 | Wang ................... | H04N 19/105 |

OTHER PUBLICATIONS

Chang et al., "Compression efficiency methods beyond VVC," JVET-U0100, 21ˢᵗ Meeting, by teleconference, Jan. 6-15, 2021, 13 pages.

Chen et al., "Algorithm Description of Joint Exploration Test Model 7 (JEM 7)," JVET-G1001-v1, 7ᵗʰ Meeting: Torino, IT, Jul. 13-21, 2017, 50 pages.

Chen et al., "Algorithm description for Versatile Video Coding and Test Model 11 (VTM 11)," JVET-T2002-v1, 20ᵗʰ meeting by teleconference, Oct. 7-16, 2020, 104 pages.

Coban et al., "Algorithm description of Enhanced Compression Model 10 (ECM 10)" JVET-AE2025, 31ˢᵗ Meeting, Geneva, CH, Jul. 11-19, 2023, 83 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn_HMJEMSSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Xie et al., "EE2-2.10: IBC-LIC extension," JVET-AE0078, 31ˢᵗ Meeting, Geneva, CH, Jul. 11-19, 2023, 5 pages.

Xiu et al., "EE2-Test2.7: Improvements on local illumination compensation," JVET-AD0213-v1, 30ᵗʰ Meeting, Antalya, TR, Apr. 21-28, 2023, 5 pages.

PCT International Search Report and Written Opinion mailed Dec. 25, 2024, issued in corresponding International Application No. PCT/CN2024/123071 (6 pgs.).

* cited by examiner

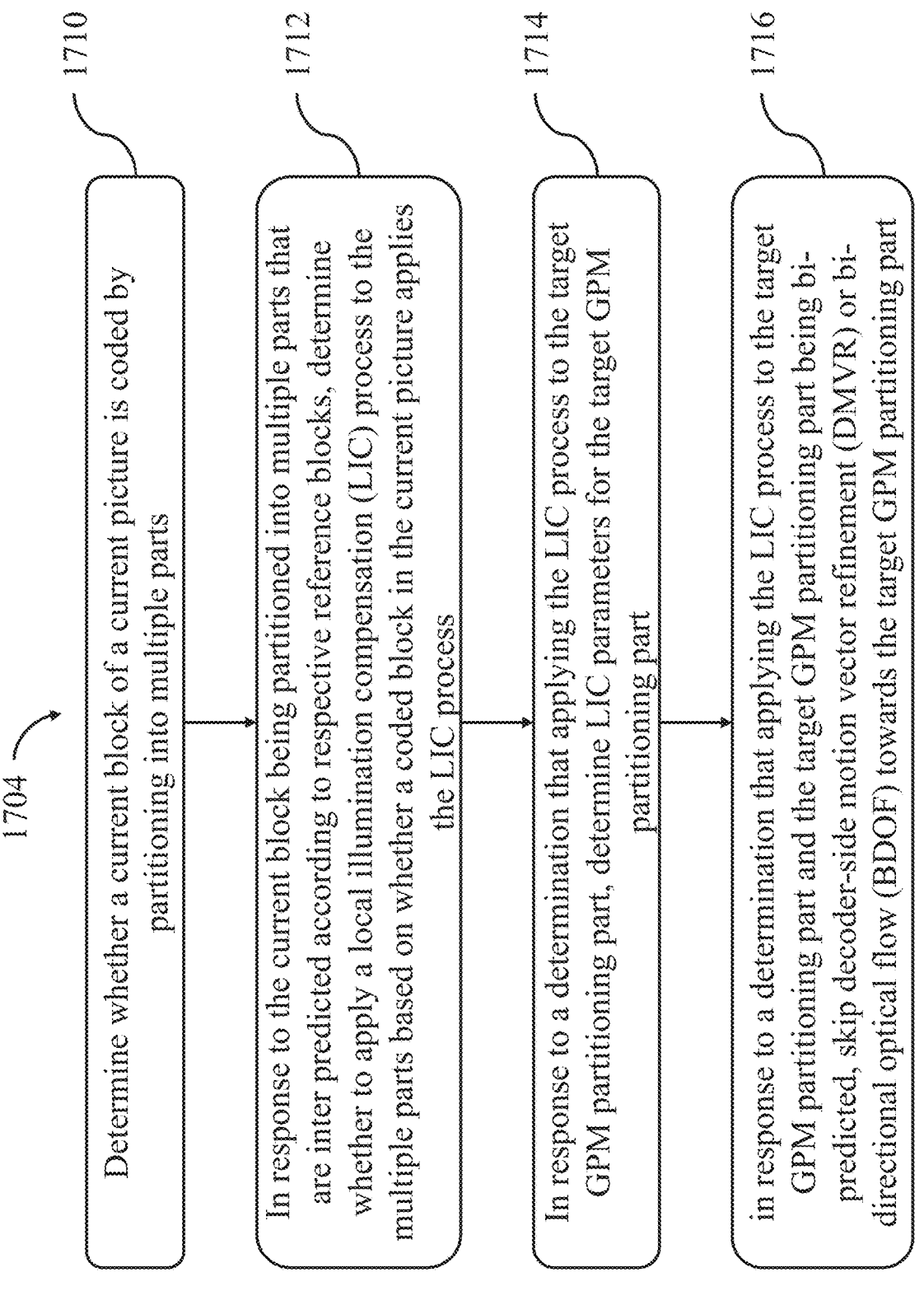

1704

1710 — Determine whether a current block of a current picture is coded by partitioning into multiple parts 1712 — In response to the current block being partitioned into multiple parts that are inter predicted according to respective reference blocks, determine whether to apply a local illumination compensation (LIC) process to the multiple parts based on whether a coded block in the current picture applies the LIC process 1714 — In response to a determination that applying the LIC process to the target GPM partitioning part, determine LIC parameters for the target GPM partitioning part 1716 — in response to a determination that applying the LIC process to the target GPM partitioning part and the target GPM partitioning part being bi-predicted, skip decoder-side motion vector refinement (DMVR) or bi-directional optical flow (BDOF) towards the target GPM partitioning part

2002 — Receive a video sequence

2004 — Encode one or more pictures of the video sequence

2006 — Generate a bitstream

LOCAL ILLUMINATION COMPENSATION

CROSS-REFERENCE TO RELATED APPLICATIONS

The disclosure claims the benefits of priority to U.S. Provisional Application No. 63/587,169, filed on Oct. 2, 2023, which is incorporated herein by reference in its entirety.

TECHNICAL FIELD

The present disclosure generally relates to video processing, and more particularly, to methods for local illumination compensation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods for local illumination compensation. Specifically, the disclosed embodiments of the present disclosure provide a method for decoding a bitstream to output one or more pictures for a video stream, a method for encoding a video sequence into a bitstream, and a non-transitory computer readable storage medium storing a bitstream of a video.

According to some exemplary embodiments, there is provided a decoding method including: receiving a bitstream; and decoding, using coded information of the bitstream, one or more pictures, wherein the decoding includes: determining whether a current block of a current picture is coded by partitioning into multiple parts; and in response to the current block being partitioned into multiple parts that are inter predicted according to respective reference blocks, determining whether to apply a local illumination compensation (LIC) process to the multiple parts based on whether a coded block in the current picture applies the LIC process.

According to some exemplary embodiments, there is provided an encoding method including: receiving a video sequence; encoding one or more pictures of the video sequence; and generating a bitstream, wherein the encoding includes: determining whether a current block is coded by partitioning into multiple parts; and in response to the current block being partitioned into multiple parts that are inter predicted according to respective reference blocks, determining whether to apply a local illumination compensation (LIC) process to the multiple parts based on whether a coded block in the current picture applies the LIC process.

According to some exemplary embodiments, there is provided a non-transitory computer readable storage medium storing a bitstream of a video. The bitstream is for processing according to a method including: determining whether a current block is coded by partitioning into multiple parts; and in response to the current block being partitioned into multiple parts that are inter predicted according to respective reference blocks, determining whether to apply a local illumination compensation (LIC) process to the multiple parts based on whether a coded block in the current picture applies the LIC process.

BRIEF DESCRIPTION OF THE DRAWINGS

Embodiments and various aspects of the present disclosure are illustrated in the following detailed description and the accompanying figures. Various features shown in the figures are not drawn to scale.

FIG. 17B is a schematic diagram illustrating sub-steps of the exemplary method shown in FIG. 17A, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve this goal, since 2015, the JVET has been developing technologies beyond HEVC using the joint exploration model (JEM) reference software. As coding technologies being incorporated into the JEM, the JEM achieved substantially higher coding performance than HEVC. In October 2017, a joint call for proposals (CfP) was issued by VCEG and MPEG to formally start the development of next generation video compression standard beyond HEVC. Responses to the CfP were evaluated at the JVET meeting in San Diego in April 2018, and the formal development process of the VVC standard started in April 2018.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

Figure 1:
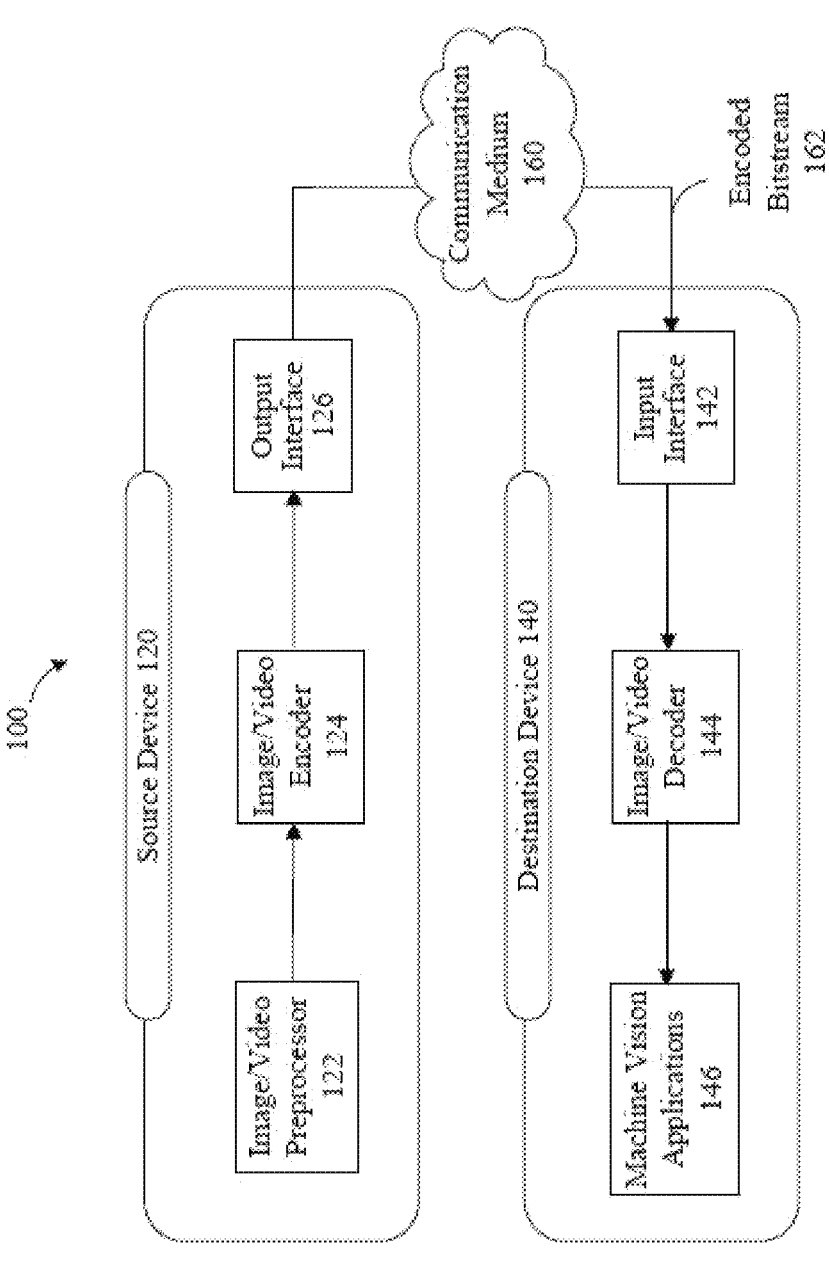
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
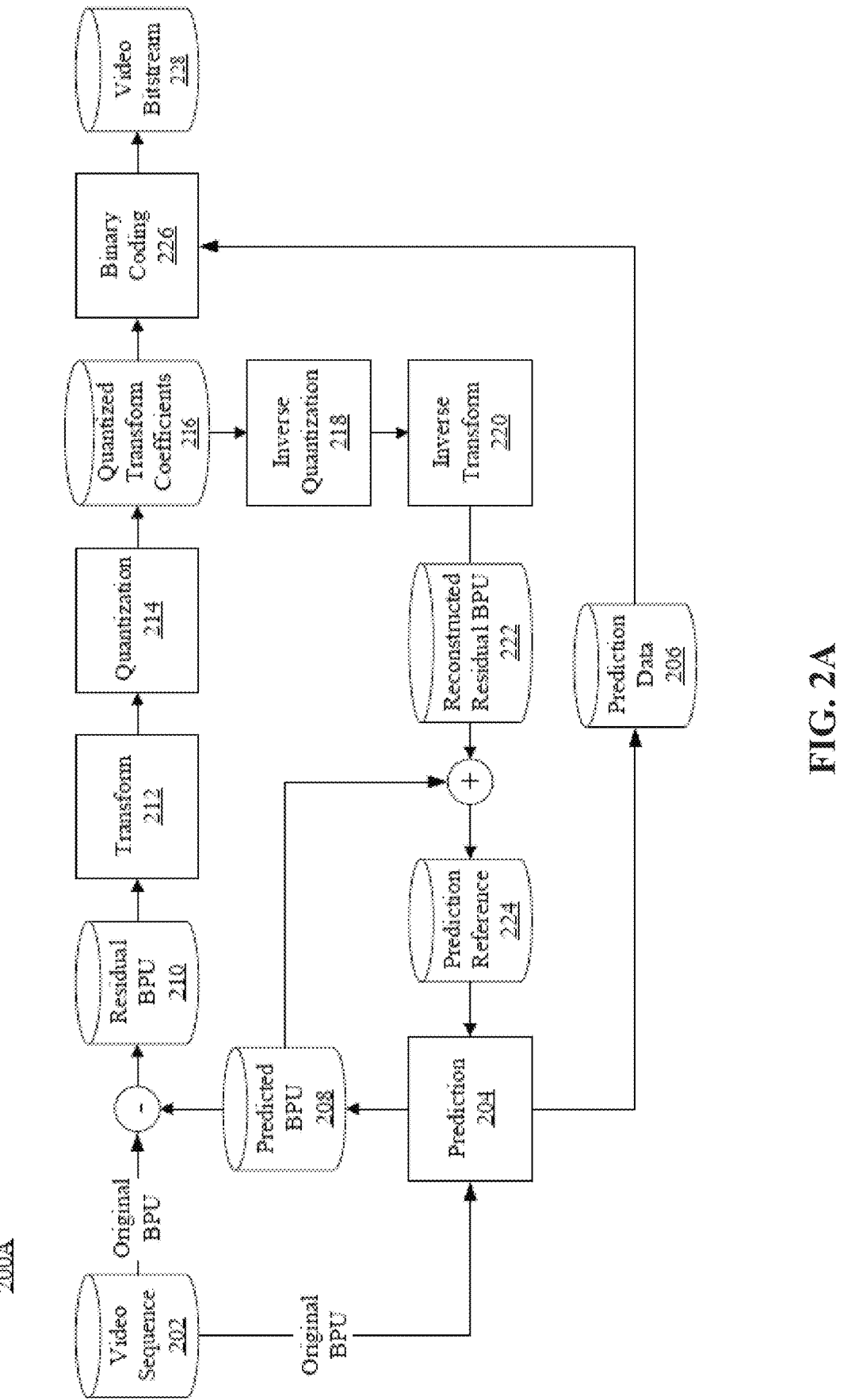
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
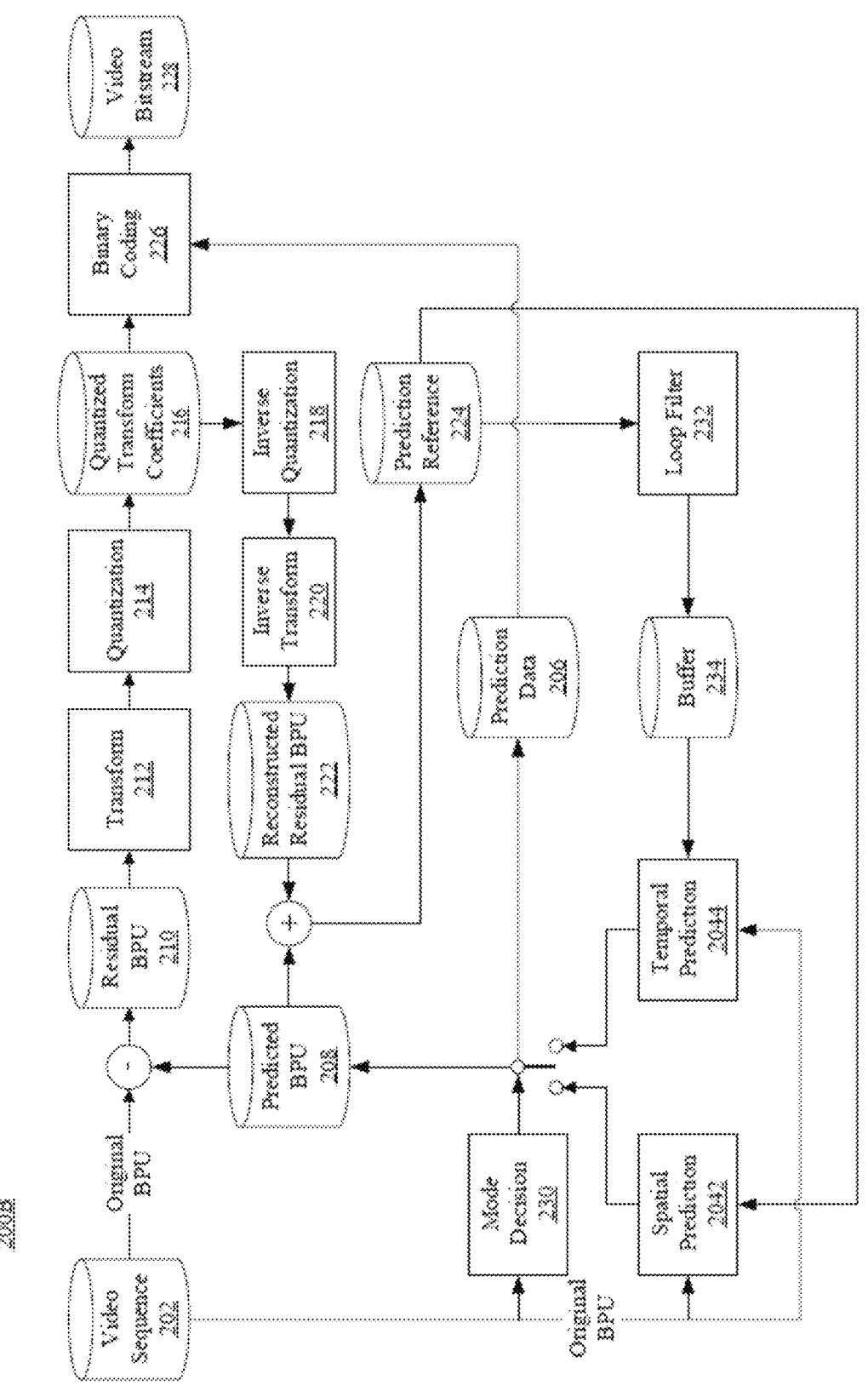
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
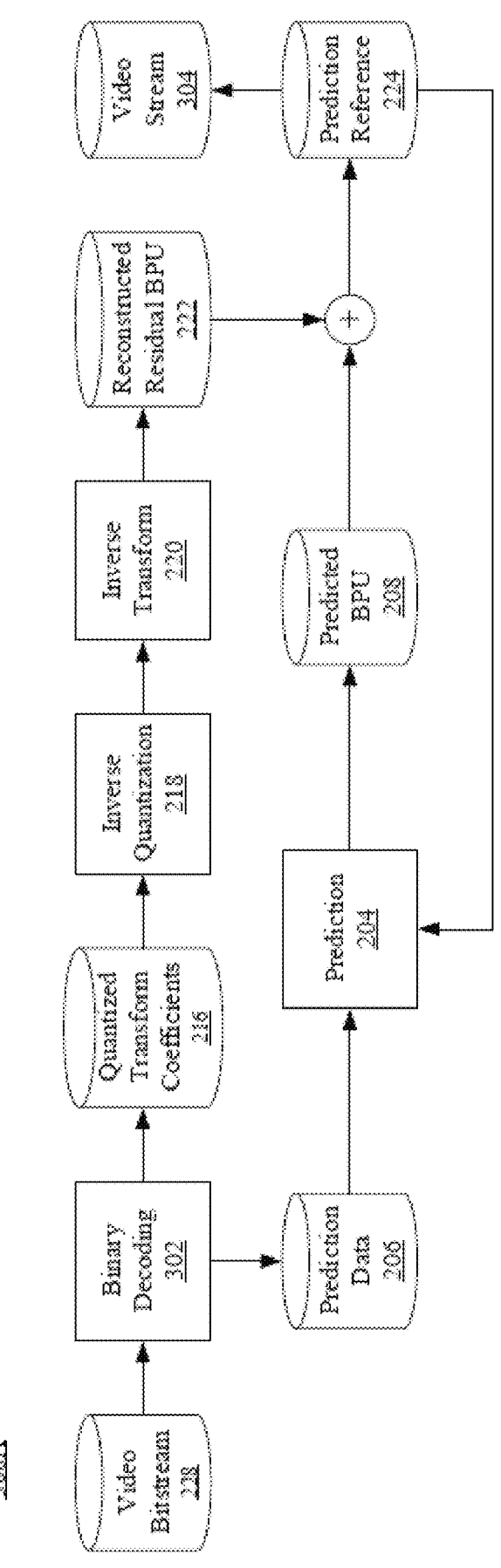
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
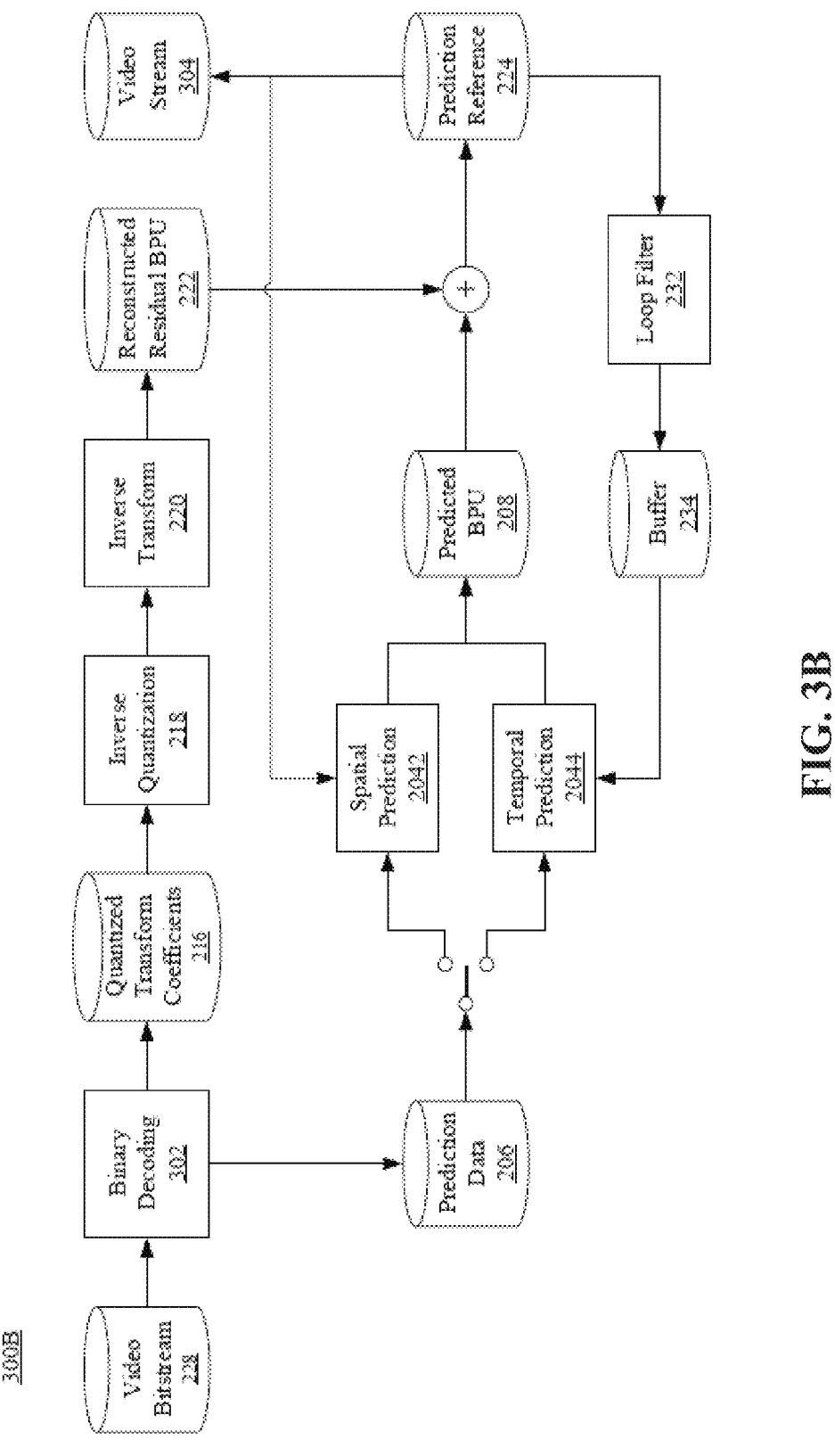
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
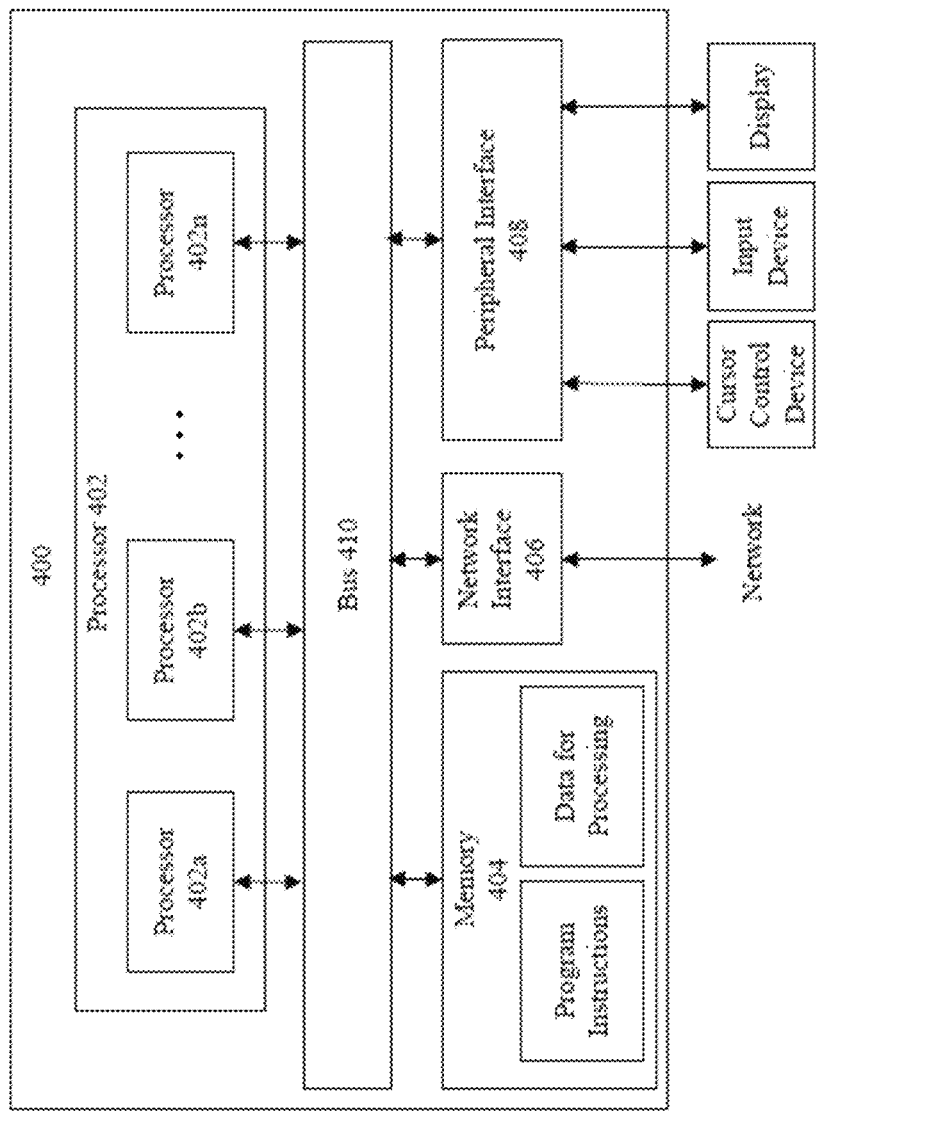
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In July 2020, the first version of VVC standard was finalized and published as an international standard. Afterward, the JVET starts exploring new coding tools to further improve the coding performance of the VVC standard (e.g., April 2020 version). In January 2021, the Enhanced Compression Model (ECM) (e.g., ECM-21.0) has been proposed and been used as new software base for developing tools beyond the VVC standard. Hereinafter, VVC/ECM can be referred to respective versions described here unless otherwise stated. As can be appreciated, the method herein may also apply to later versions of VVC/ECM if any.

Figure 5:
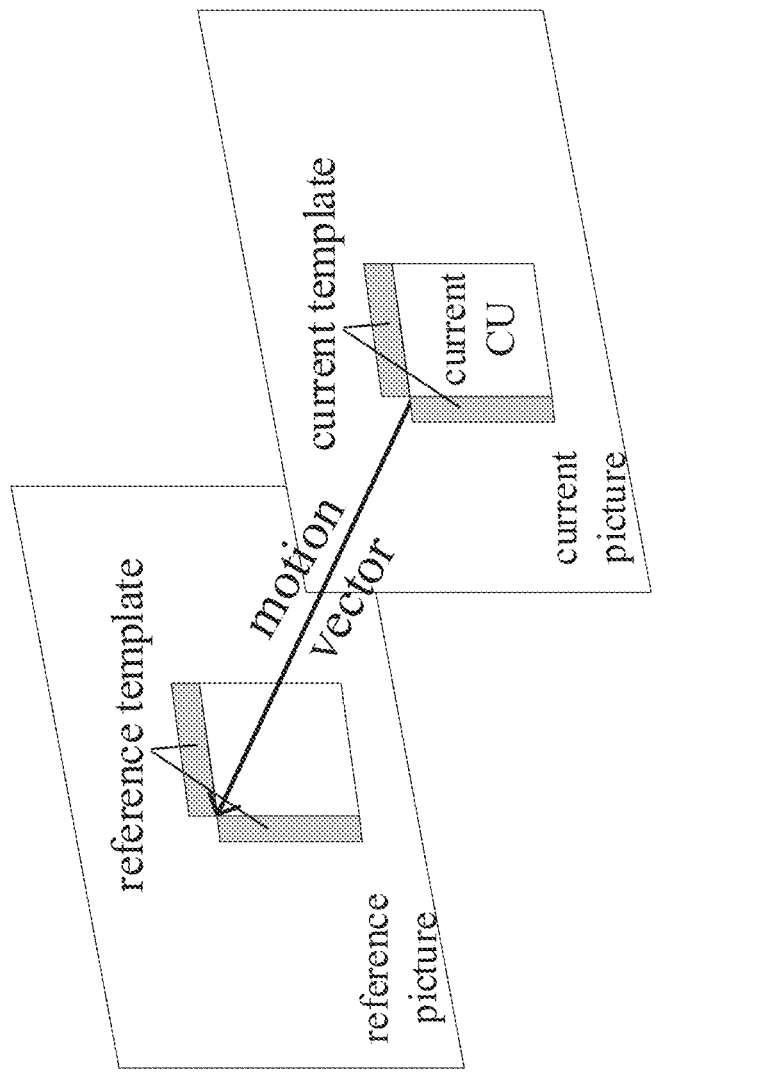
FIG. 5 is a schematic diagram illustrating an exemplary local illumination compensation (LIC) template, according to some embodiments of the present disclosure.

Local illumination compensation (LIC) is an inter prediction technique to model local illumination variation between current block and its reference block as a function of that between current block template and reference block template. The parameters of the function can be denoted by a scale $\alpha$ and an offset $\beta$, which forms a linear equation to compensate illumination changes. The parameters $\alpha$ and $\beta$ can be derived based on current template and reference template as shown in FIG. 5. The samples in current template of the current picture can be the available reconstructed samples in the above neighboring row and left neighboring column of the current block (may be also referred to as a coding unit (CU) in the present disclosure). The samples of the reference template of the reference picture can be generated by using motion compensation with the motion vector of the current block. In some implementations, a subset of the samples in the current template and the reference template can be used to derive the LIC parameters. The derived parameters are then applied to adjust the prediction values of samples in the current block as:

$$P'(x, y) = \alpha \cdot P(x, y) + \beta \tag{1}$$

where (x, y) indicates the coordinate position of a sample within the current block; P(x, y) indicates the prediction value of the sample after motion compensation; P'(x, y) indicates the adjusted prediction value of the sample after applying LIC linear model; and $\alpha$ and $\beta$ are LIC parameters.

Since LIC parameters $\alpha$ and $\beta$ can be derived based on current template and reference template at both encoder and decoder sides, no signaling overhead is required for them, except that an LIC flag is signaled in CU level for advanced motion vector prediction (AMVP) mode to indicate the use of LIC. For a merge mode coded CU, the LIC flag can be inherited from a coded block according to the merge candidate index.

In some of the disclosed embodiments, LIC can be extended to bi-predictive blocks. Specifically, two different linear models are derived to compensate the illumination changes that exist between the current block and its two reference blocks. Then, the final bi-prediction of the current block is calculated as the combination of two uni-prediction blocks after the LIC adjustment, i.e., $$P'[x, y] = (1 - \omega) \cdot p'_0[x, y] + \omega \cdot p'_1[x, y] \tag{2}$$

and $$P'_0[x, y] = \alpha_0 \cdot P_0[x, y] + \beta_0 \tag{3}$$

$$P'_1[x, y] = \alpha_1 \cdot P_1[x, y] + \beta_1 \tag{4}$$

where $\alpha_0$ and $\beta_0$, and $\alpha_1$ and $\beta_1$ indicate the scales and the offsets in L0 and L1, respectively; @ indicates the weight (as indicated by the CU-level BCW index) that is applied when combining the two uni-prediction blocks. Same as the current LIC design, one control flag is signaled for AMVP bi-predictive CUs to indicate the enabling/disabling of the LIC while the flag is inherited from one coded block for merge mode coded CUs (including AMVP-Merge mode).

Additionally, the LIC is disabled when decoder-side motion vector refinement (DMVR) (including multi-pass DMVR, adaptive DMVR and affine DMVR) and bi-directional optical flow (BDOF) is applied.

To reuse the linear model derivation of the existing LIC, one iterative approach is applied to alternately derive the L0 and L1 linear models. Specifically, given the two MVs of the current block, it assumes $T_0$ and $T_1$ are the two predictions of the current block's template T. The method firstly derives the L0 linear model ($\alpha_0$ and $\beta_0$) that result in the minimum difference between $T_0$ and T; then the L1 linear model ($\alpha_1$ and $\beta_1$) can be calculated that minimizes the difference between $T_1$ and the updated template. Finally, the L0 linear model is refined again in the same way.

For a combined intra and inter prediction (CIIP) coded block, when calculating the inter prediction, the LIC flag can be inherited from a coded block according to the merge candidate index. In some implementations, the LIC flag can only be inherited for low delay pictures when the difference between the POC index of the L0 reference picture and the POC index of the current picture is 1.

A conventional LIC method is not applied to geometric partition mode (GPM) coded blocks.

In VVC, a geometric partition mode (GPM) is supported for inter prediction. The geometric partitioning mode is signalled using a CU-level flag as one kind of merge mode. In total 64 GPM split modes are supported for each possible CU size.

Figure 6:
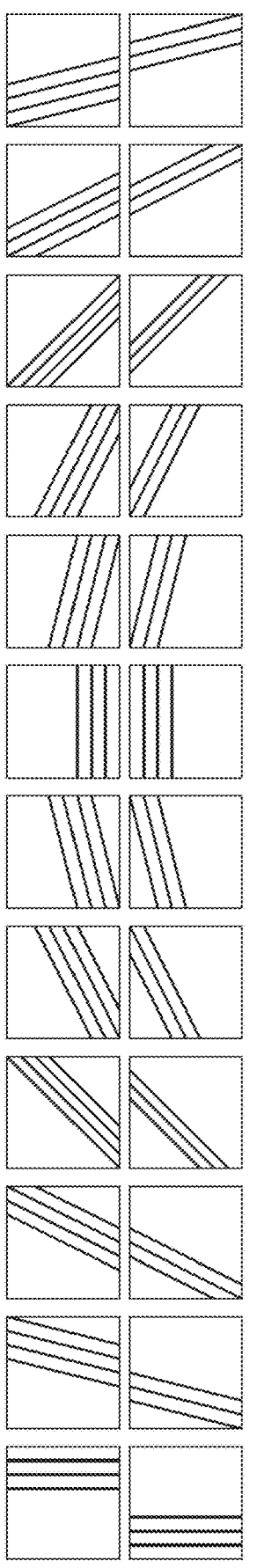
FIG. 6 is a schematic diagram illustrating examples of geometric partition mode (GPM) splits grouped by identical angles, according to some embodiments of the present disclosure.

When the GPM mode is used, a CU is split into two parts by a geometrically located straight line (FIG. 6) according to the GPM split mode. The location of the splitting line is mathematically derived from the angle and offset parameters of a specific partition. Table 1 shows the relationship between GPM split modes (merge_gpm_partition_idx) and GPM partition angles (angleIdx). Each part of a geometric partition in the CU is inter-predicted using its own motion; only uni-prediction is allowed for each partition in VVC, that is, each part has one motion vector and one reference index. The uni-prediction motion constraint is applied to ensure that same as the conventional bi-prediction, only two motion compensated prediction are needed for each CU.

If GPM mode is used for the current CU, then a geometric partition index indicating the split mode (corresponding to an angle and an offset), and two merge indices (one for each part) are further signalled. The number of maximum GPM candidate size is signalled explicitly in SPS and specifies syntax binarization for GPM merge indices. After predicting each part of the geometric partition, the predicted sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the GPM mode is stored.

Figure 7:
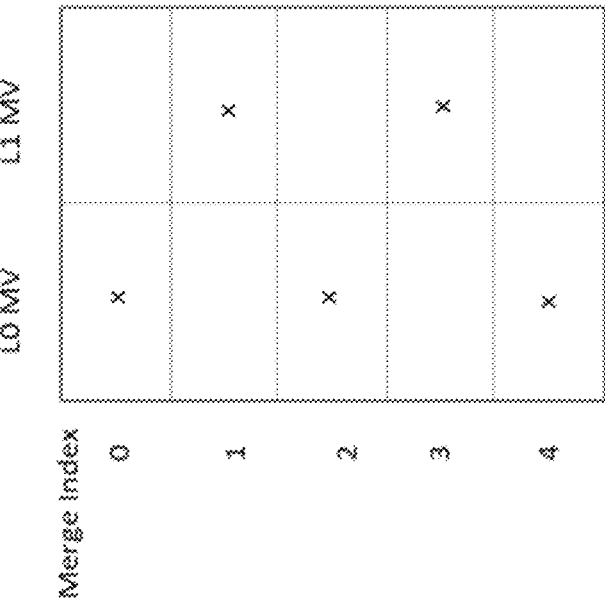
FIG. 7 is a schematic diagram illustrating a uni-prediction motion vector (MV) selection for geometric partitioning mode, according to some embodiments of the present disclosure.

VVC is derived directly from the merge candidate list constructed for regular merge mode. Denote n as the index of the uni-prediction motion in the geometric uni-prediction candidate list. The LX motion vector of the $n^{th}$ extended merge candidate, with X equal to the parity of n, is used as the $n^{th}$ uni-prediction motion vector for geometric partitioning mode. These motion vectors are marked with "x" in FIG. 7. In case a corresponding LX motion vector of the $n^{th}$ extended merge candidate does not exist, the $L(1-X)$ motion vector of the same candidate is used instead as the uni-prediction motion vector for geometric partitioning mode.

In ECM, a new uni-prediction candidate list is proposed with the following constructed order:

Interleaved L0 MV candidates and L1 MV candidates are derived directly from the regular merge candidate list, where L0 MV candidates are higher priority than L1 MV candidates. A pruning method with an adaptive threshold based on the current CU size is applied to remove redundant MV candidates.

Interleaved L1 MV candidates and L0 MV candidates are further derived directly from the regular merge candidate list, where L1 MV candidates are higher priority than L0 MV candidates. The same pruning method with the adaptive threshold is also applied to remove redundant MV candidates.

Zero MV candidates are padded until the GPM candidate list is full.

In some embodiments, bi-prediction GPM is used. In ECM, the current GPM design is extended to allow the usage of bi-predictive MVs, which means each part of GPM coded block can be predicted by uni-prediction or bi-prediction. For small blocks, such as 8×8, 16×8 and 8×16 blocks, only uni-prediction is allowed and the uni-prediction candidate list as described above is used. For other larger blocks, a new merge list (which may contain bi-predictive motions) is used. The generation of the new merge list is the same as the regular merge list except that the motion vector difference threshold for controlling whether a candidate can be added into the list is increased.

In some embodiments, blending along the geometric partitioning edge is used.

TABLE 1

The relationship between GPM split modes (merge_gpm_partition_idx) and GPM partition angles (angleIdx).

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Next, GPM candidate list construction is described.

In some embodiments, uni-prediction candidate list construction is used. The uni-prediction candidate list used in Next, blending method in VVC is described. In VVC, after predicting each part of a geometric partition using its own motion information, blending is applied to the two prediction signals to derive samples around geometric partition edge. The blending weight for each position of the CU are derived based on the distance between individual position and the partition edge.

The distance for a position (x, y) to the partition edge are derived as:

$$d'(x, y) = (2x + 1 - w)\cos(\varphi_i) + (2y + 1 - h)\sin(\varphi_i) - \rho_j \quad (5)$$

$$\rho_j = \rho_{x,j}\cos(\varphi_i) + \rho_{y,j}\sin(\varphi_i) \quad (6)$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \quad (7)$$

$$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \quad (8)$$

where i, j are the indices for angle and offset of a geometric partition, which depend on the signaled geometric partition index. The sign of $\rho_{x,j}$ and $\rho_{y,j}$ depend on angle index i.

20

The MVD is signaled as a pair of distance and direction. There are nine candidate distances ($\frac{1}{4}$-pel, $\frac{1}{2}$-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD).

Next, GPM with template matching (GPM-TM) is described. In ECM, a template matching method is applied to GPM. When GPM mode is enabled for a CU, a CU-level flag is signaled to indicate whether template matching is applied to both geometric parts. Motion information for each geometric part is refined using TM. When TM is chosen, a template is constructed using left, above or left and above neighboring samples according to partition angle, as shown in Table 2. The motion is then refined by minimizing the difference between the template of the current block and the template in the reference picture using the same search pattern of merge mode with half-pel interpolation filter disabled.

TABLE 2

| Template for the 1st and 2nd geometric parts, where A represents using above neighboring samples, L represents using left neighboring samples, and L + A represents using both left and above neighboring samples. | | | | | | | | | |
|---|---|---|---|---|---|---|---|---|---|
| Partition angle | 0 | 2 | 3 | 4 | 5 | 8 | 11 | 12 | 13 | 14 |
| $1^{st}$ partition | A | A | A | A | L + A | L + A | L + A | L + A | A | A |
| $2^{nd}$ partition | L + A | L + A | L + A | L | L | L | L | L + A | L + A | L + A |
| Partition angle | 16 | 18 | 19 | 20 | 21 | 24 | 27 | 28 | 29 | 30 |
| $1^{st}$ partition | A | A | A | A | L + A | L + A | L+A | L+A | A | A |
| $2^{nd}$ partition | L + A | L + A | L + A | L | L | L | L | L + A | L + A | L + A |

The weights for each part of a geometric partition are derived as following:

$$wIdxL(x, y) = partIdx \; ? \; 32 + d(x, y): 32 - d(x, y) \quad (9)$$

$$w_0(x, y) = \frac{Clip3(0, 8, (wIdxL(x, y) + 4) \gg 3)}{8} \quad (10)$$

$$w_1(x, y) = 1 - w_0(x, y) \quad (11)$$

Figure 8:
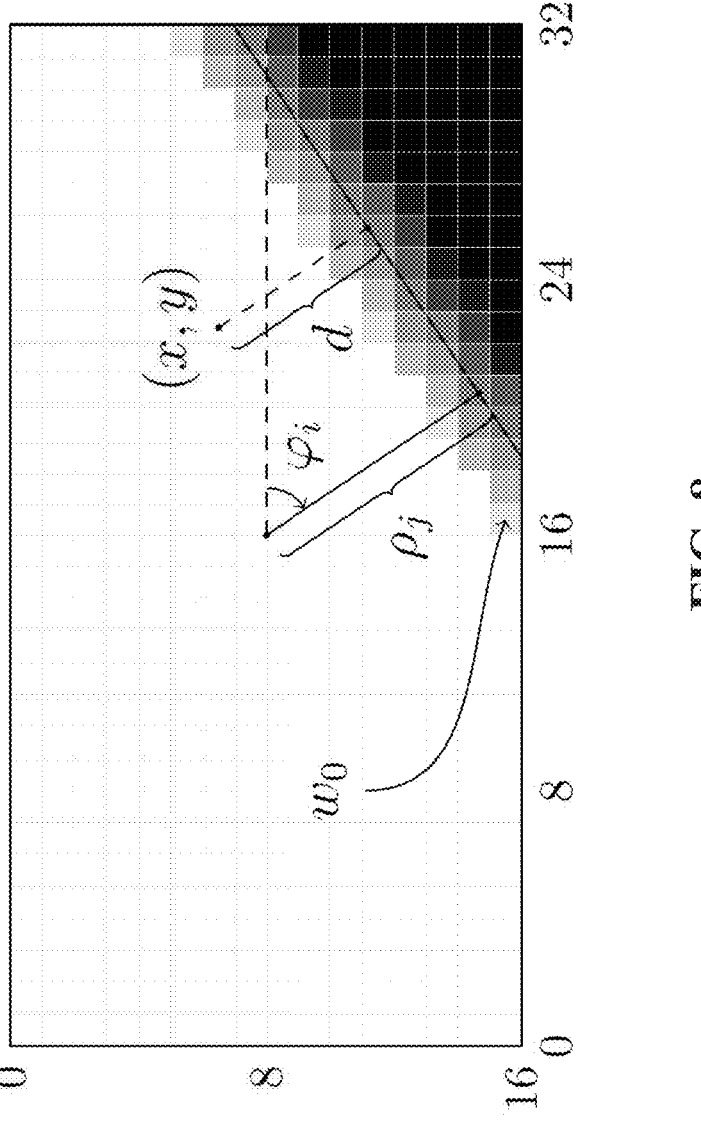
FIG. 8 is a schematic diagram illustrating an exemplified generation of a bending weight $w_0$ using geometric partitioning mode, according to some embodiments of the present disclosure.

The partIdx depends on the angle index i. One example of weigh $w_0$ is illustrated in FIG. 8.

Figure 9:
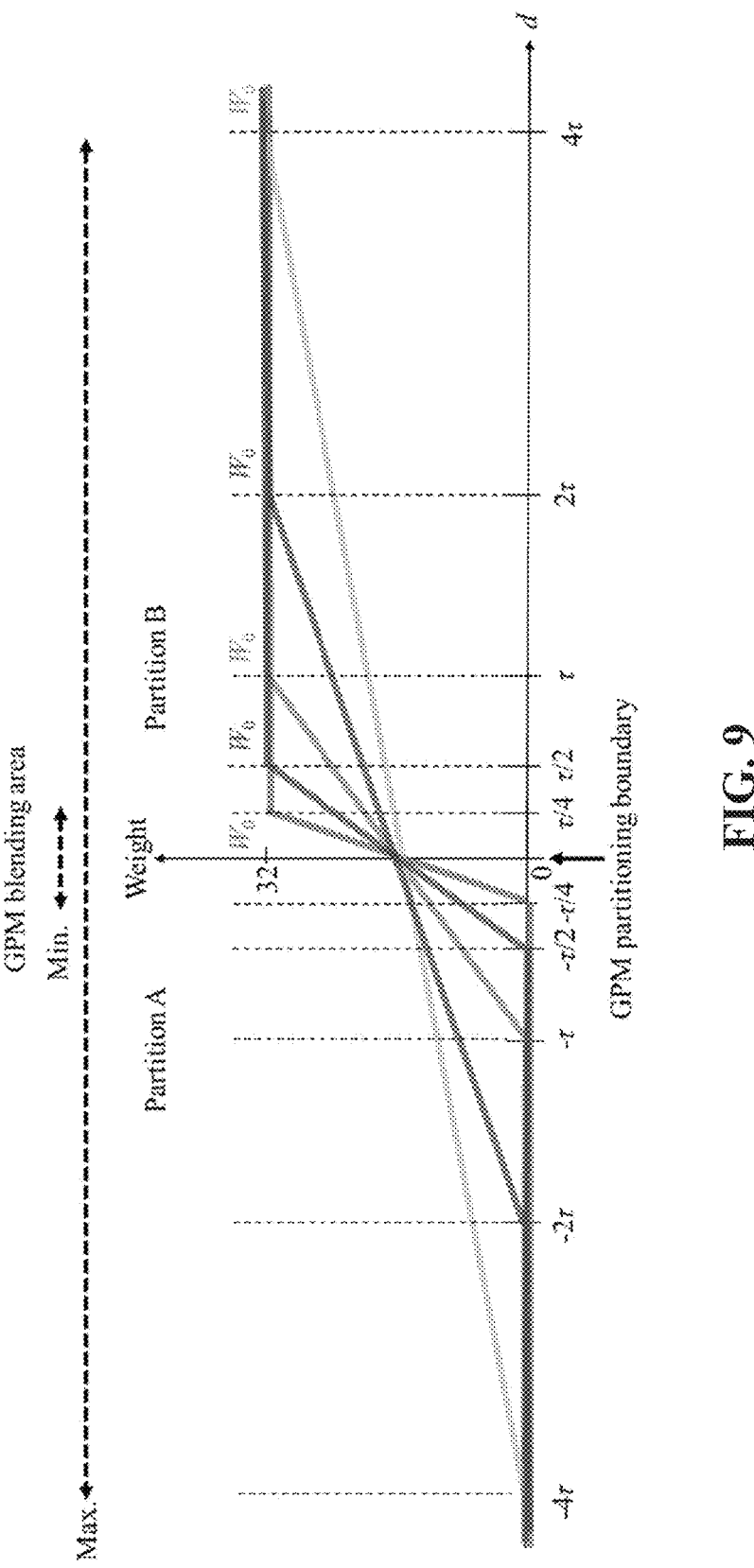
FIG. 9 is a schematic diagram illustrating five exemplary blending area sizes for GPM in Enhanced Compression Model (ECM), according to some embodiments of the present disclosure.

Next, blending method in ECM is described. In ECM, the blending process is improved by adding four extra blending area sizes (quarter, half, double, and quadrupole of the blending area size in VVC) as shown in FIG. 9. A CU level flag to indicate the selected blending area size is signalled. Furthermore, the extended weighting precision is utilized, in which the maximum value of the weighs is changed from 8 (in VVC) to 32 to accommodate the extended blending area sizes.

Next, GPM with motion vector refinement (GPM-MMVD) is described. In ECM, GPM is extended by applying motion vector refinement on top of the GPM uni-predictive MVs. A flag is first signalled for a GPM coded CU, to specify whether GPM MMVD mode is used. If the mode is used, each part of a geometric partition in a CU can further decide whether to signal MVD or not. If MVD is signalled for a geometric part, after a GPM merge candidate is selected, the motion of the part is further refined by the signalled MVDs information.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

Next, GPM split modes reordering is described. In ECM, the 64 GPM split modes can be reordered by template matching. Given the motion information of the current GPM coded block, the respective TM cost values between the current template and reference template of GPM split modes are computed. Then, all GPM split modes are reordered in ascending ordering based on the TM cost values. Instead of sending GPM split mode, an index using Golomb-Rice code to indicate where the exact GPM split mode located in the reordering list is signaled.

The reordering method for GPM split modes is a two-step process performed after the respective reference templates of the two GPM partition parts in a CU are generated, as follows:

extending GPM partition edge into the reference templates of the two GPM partition parts, resulting in 64 reference templates and computing the respective TM cost for each of the 64 reference templates;

reordering GPM split modes based on their TM cost values in ascending order and marking the best 32 split modes as available split modes.

Figure 10:
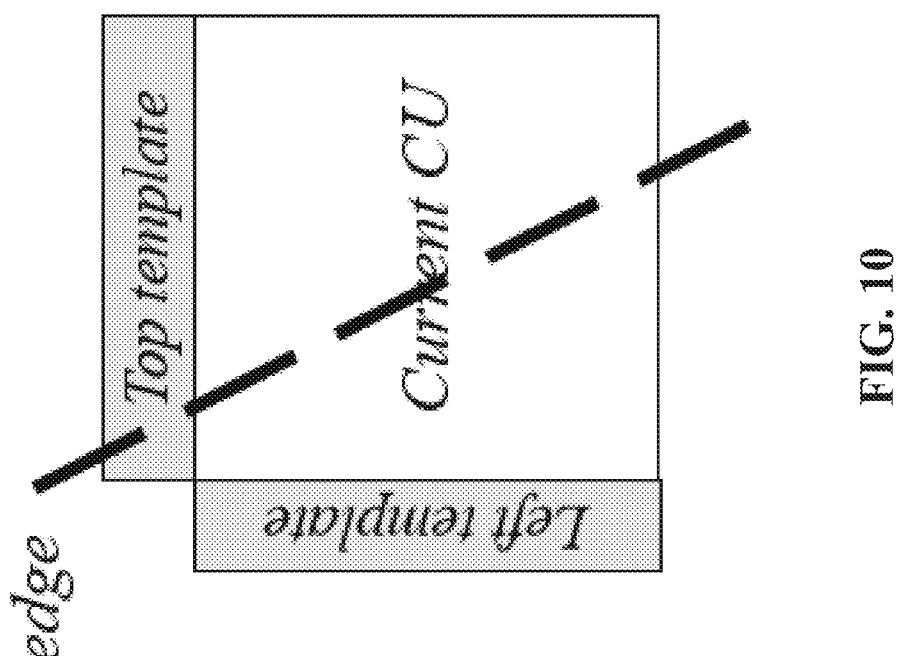
FIG. 10 is a schematic diagram illustrating an exemplary edge on templates of GPM split modes, according to some embodiments of the present disclosure.

The edge on the template is extended from that of the current CU, as FIG. 10 illustrates, but GPM blending process is not used in the template area across the edge.

After ascending reordering using TM cost, an index is signaled to indicate the GPM split mode.

Figure 11B:
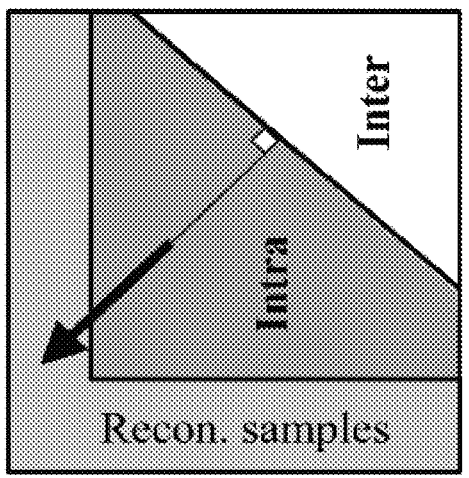
FIGS. 11A-D are schematic diagrams illustrating a GPM with inter and intra prediction, according to some embodiments of the present disclosure.
Figure 11D:
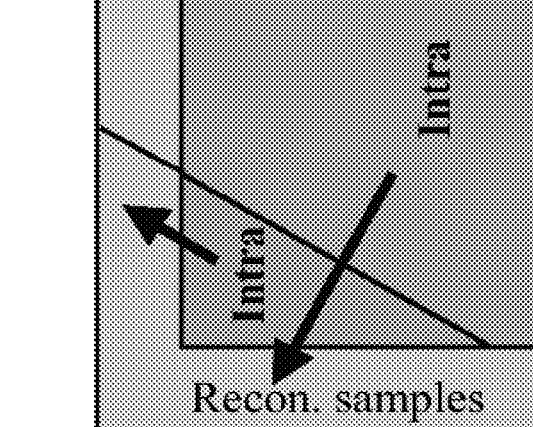
Figure 11A:
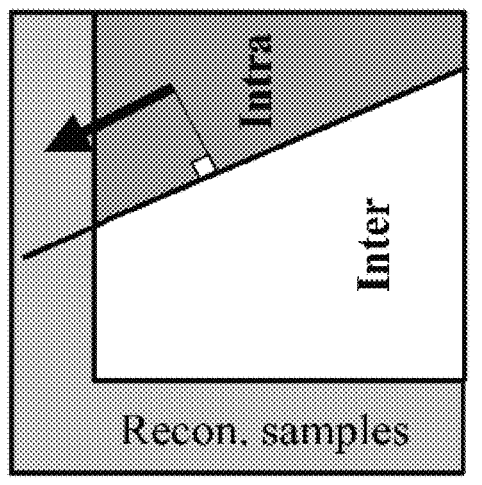
Figure 11A:
Figure 11C:
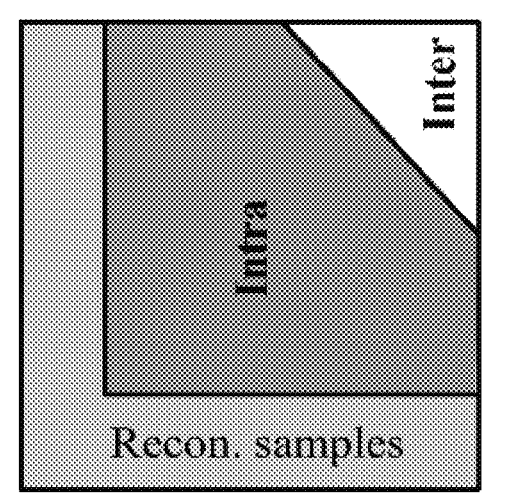

Next, GPM intra inter mode is described. In GPM with inter and intra prediction, the final prediction samples are generated by weighting inter predicted samples and intra predicted samples for each GPM partition part. The inter predicted samples are derived by inter prediction whereas the intra predicted samples are derived by an intra prediction mode (IPM) candidate list and an index signaled from the encoder. The IPM candidate list size is pre-defined as 3. The available IPM candidates are the parallel angular mode against the GPM block boundary (Parallel mode), the perpendicular angular mode against the GPM block boundary (Perpendicular mode), and the Planar mode as shown FIG. 11A-FIG. 11C, respectively. Furthermore, GPM with intra and intra prediction as shown FIG. 11D is restricted to reduce the signalling overhead for IPMs and avoid an increase in the size of the intra prediction circuit on the hardware decoder. In addition, a direct motion vector and IPM storage on the GPM-blending area is introduced to further improve the coding performance.

In some implementation, a DIMD and neighboring mode based IPM derivation is used, where the Parallel mode is registered first. Therefore, max two IPM candidates derived from the decoder-side intra mode derivation (DIMD) method and/or the neighboring blocks can be registered if there is not the same IPM candidate in the list. As for the neighboring mode derivation, there are five positions for available neighboring blocks at most.

GPM-intra can be combined with GPM with merge with motion vector difference (GPM-MMVD). TIMD is used for on IPM candidates of GPM-intra to further improve the coding performance. The Parallel mode can be registered first, then IPM candidates of TIMD, DIMD, and neighboring blocks.

Next, motion field storage for geometric partitioning mode is described. Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType=abs(motionIdx)<32?2:(motionIdx\leq0?(1-partIdx):partIdx) \qquad (12)$$

where motionIdx is equal to d(4x+2,4y+2), which is recalculated from equation (1). The partIdx depends on the angle index i.

If sType is equal to 0 or 1, Mv1 or Mv2 are stored in the corresponding motion field, otherwise if sType is equal to 2, a combined Mv from Mv1 and Mv2 are stored. The combined Mv are generated using the following process:

If Mv1 and Mv2 are from different reference picture lists (one from L0 and the other from L1), then Mv1 and Mv2 are simply combined to form the bi-prediction motion vectors.

Otherwise, if Mv1 and Mv2 are from the same list, only uni-prediction motion Mv2 is stored.

Figure 12:
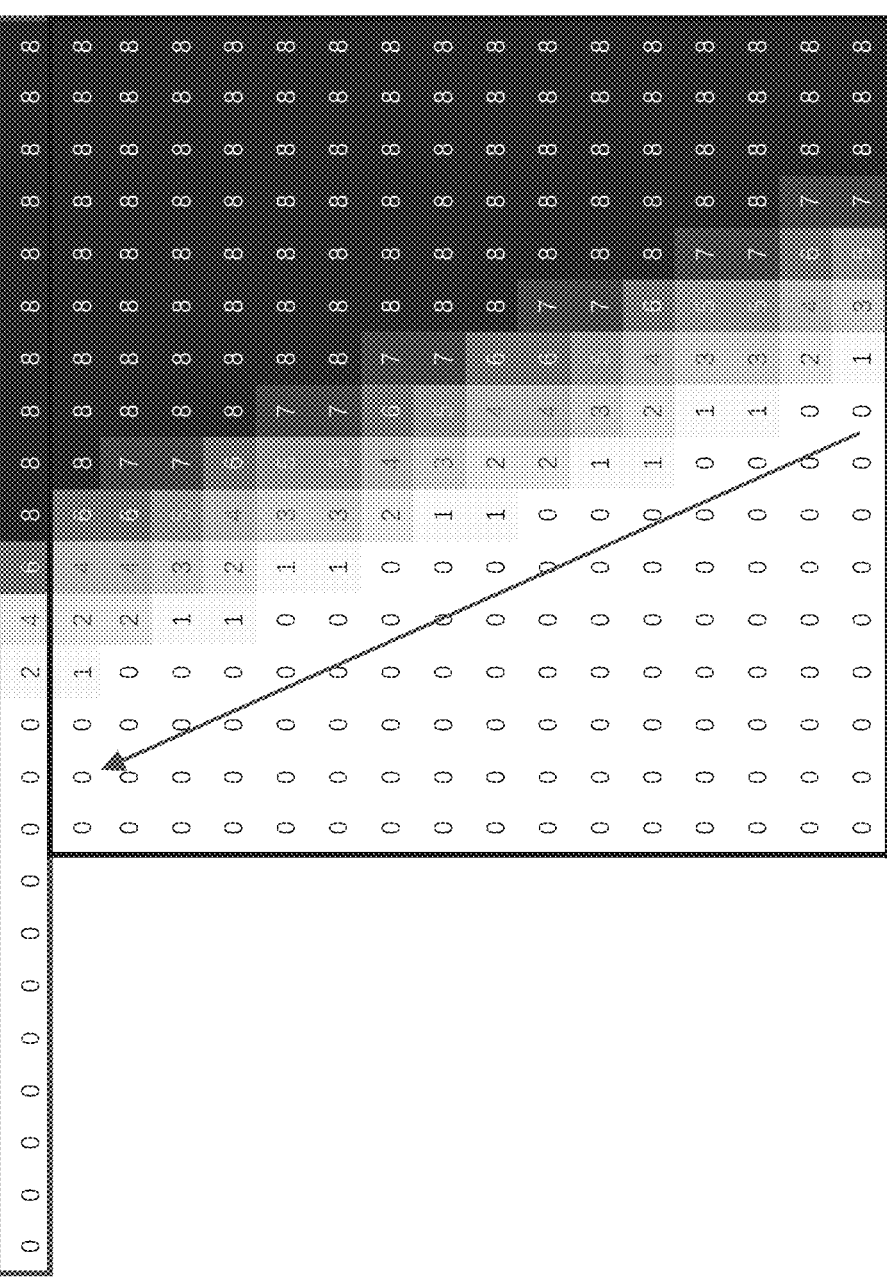
FIG. 12 is a schematic diagram illustrating an example for angular weighted prediction (AWP) weight prediction, according to some embodiments of the present disclosure.
Figure 13:
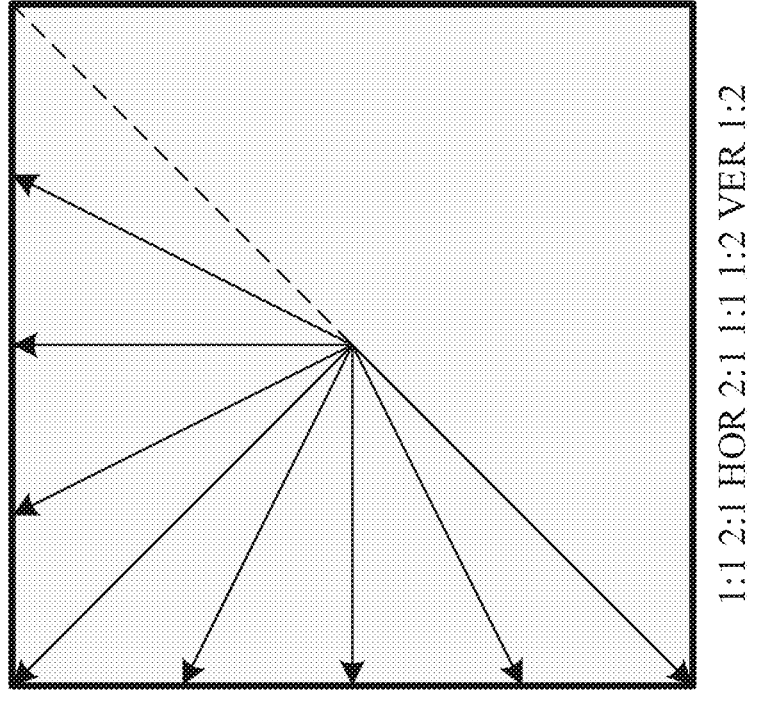
FIG. 13 is a schematic diagram illustrating eight exemplary intra prediction angles supported in the AWP mode, according to some embodiments of the present disclosure.
Figure 14:
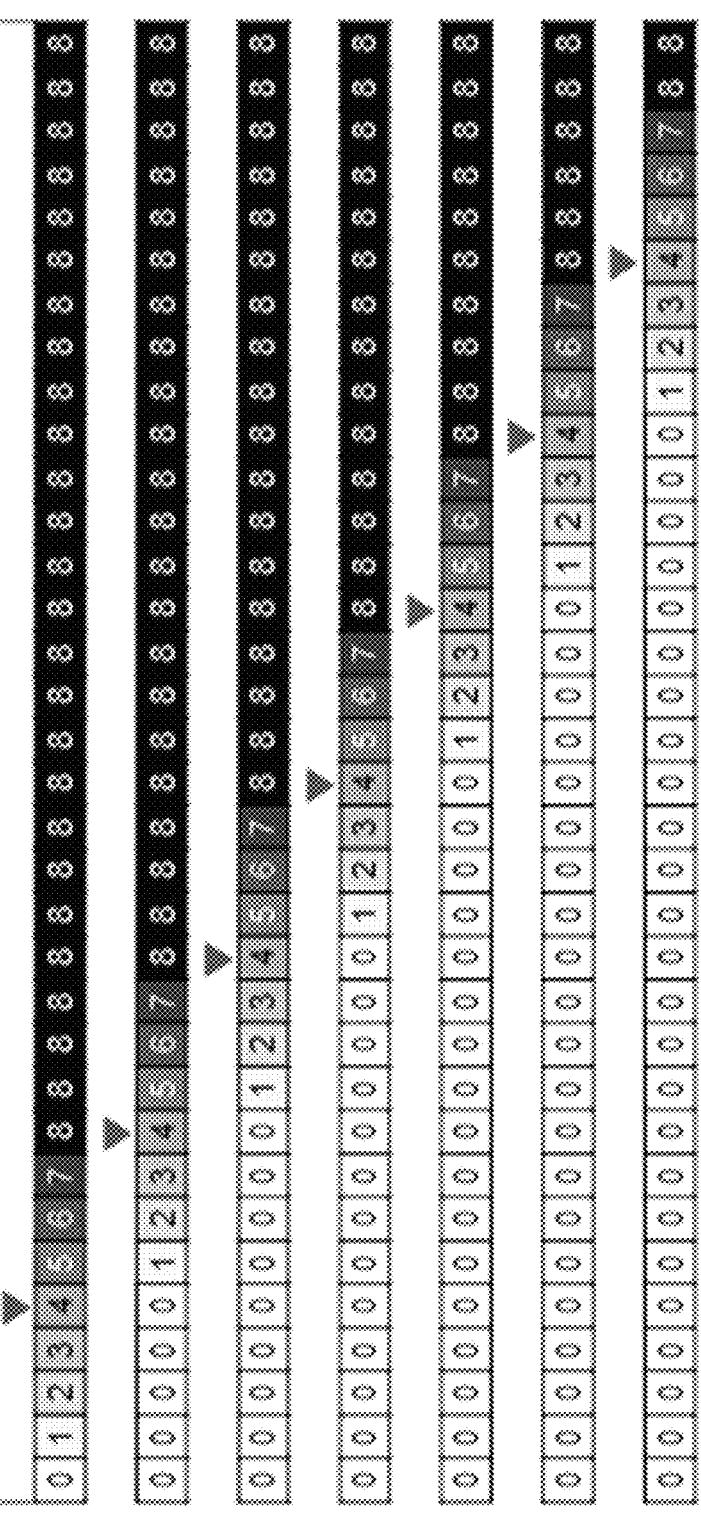
FIG. 14 is a schematic diagram illustrating seven different weight array settings in the AWP mode, according to some embodiments of the present disclosure.

Next, angular weighted prediction (AWP) is described. Similar to GPM in VVC, one tool called angular weighted prediction (AWP) is adopted in Audio Video coding Standard 3 (AVS3). AVS3 video standard is developed by AVS Workgroup which was founded in 2002 in China. The predecessor of AVS3 standard, AVS1 and AVS2 were issued as China national standard in the year of 2006 and 2016, respectively. In AVS3, an angular weighted prediction mode is supported for skip and direct mode. The AWP mode is signalled using a CU-level flag as one kind of skip or direct mode. In the AWP mode, a motion vector candidate list, which contains five different uni-prediction motion vectors, is firstly constructed by deriving motion vectors from spatial neighboring blocks and temporal motion vector predictor. Secondly, two uni-prediction motion vectors are selected from the motion vector candidate list to predict the current block. Unlike the bi-prediction inter mode which has equal weights for all samples, each sample coded in AWP mode may have different weights. The weight for each sample is predicted from a weight array which has values from 0 to 8. The weight prediction is similar to the process of intra prediction mode, as shown in the FIG. 12. In total 56 different kinds of weights are supported by AWP mode for each possible CU size $w \times h = 2^m \times 2^n$ with $m,n \in \{3 \ldots 6\}$, including 8 intra prediction angles (shown in FIG. 13) and 7 different weight array settings (shown in FIG. 14). It is noted that the AWP mode is directly signaled to decoder without prediction. The AWP mode index is binarized using truncated binary, that is, index 0 to 7 are coded using 5 bits and index 8 to 55 are coded using 6 bits.

Assuming that the two selected uni-prediction motion vectors are Mv0 and Mv1. Two prediction blocks, P0 and P1, are obtained by performing motion compensation using Mv0 and Mv1, respectively. The final prediction block P is calculated as follows:

$$P = (P0 \times w0 + P1 \times (8 - w0)) \gg 3, \qquad (13)$$

where the w0 is the weight matrix derived by the aforementioned weight prediction method.

After prediction, the uni-prediction motion vectors are stored in 4×4 granularity. For each 4×4 unit, one of two uni-prediction motion vector is stored.

In some of the disclosed embodiments, Overlapped Block Motion Compensation (OBMC) is an inter coding tool used in ECM. When OBMC is applied to a CU, it is performed for top and left boundaries of a CU. Moreover, when a CU is coded with sub-CU mode (like affine mode and DMVR mode), the OBMC will be further performed for the boundaries of each sub-CU of the CU expect the boundaries of the CU. To process boundaries in a uniform fashion, OBMC is performed at a 4×4 sub-block level for all enabled boundaries. OBMC is applied for both the luma and chroma components.

Figure 15:
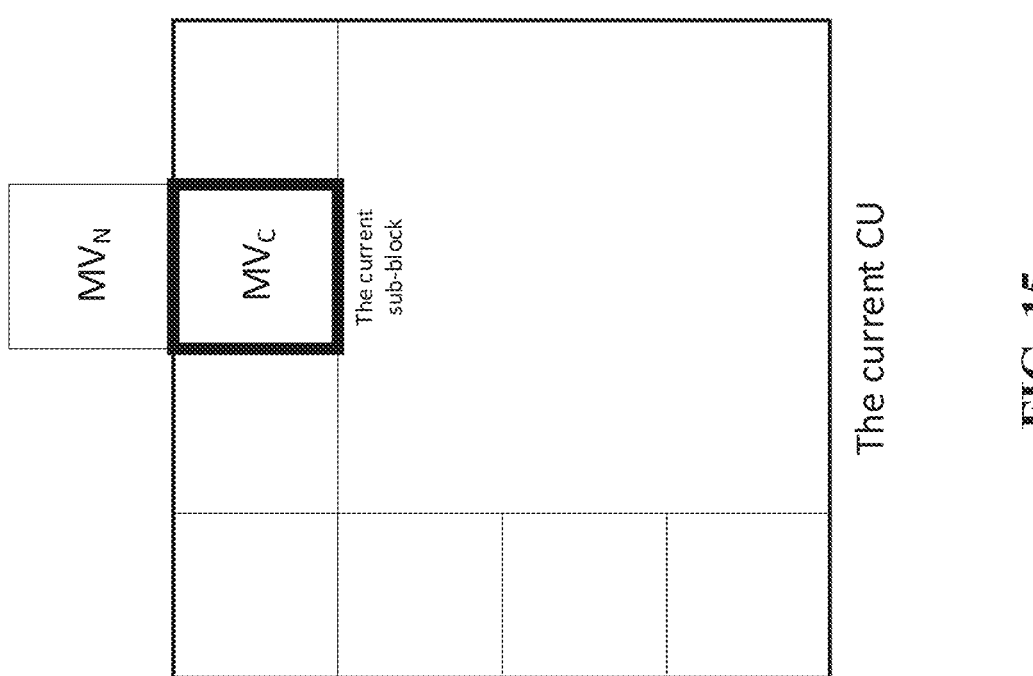
FIG. 15 is a schematic diagram illustrating Overlapped Block Motion Compensation (OBMC) for coding unit (CU) boundary, according to some embodiments of the present disclosure.

For top and left CU boundaries, OBMC can be performed at a 4×4 sub-block level as shown in FIG. 15. When OBMC applies to the current sub-block, besides current motion vector $MV_C$, motion vector from top neighboring sub-block when the current sub-block is in the top boundary or motion vector from left neighboring sub-block when the current sub-block is in the left boundary $MV_N$, if available and are not identical to the current motion vector $MV_C$, are also used to derive prediction block for the current sub-block. The prediction signal based on the current motion vector $MV_C$ which is denoted as $pred_C$, and the prediction signal based on the neighboring motion vector $MV_N$ which is denoted as $pred_N$, are blended to generate the final prediction signal of the current sub-block pred. If $MV_N$ is equal to $MV_C$, the OBMC is not performed for the current sub-block.

For sub-CU boundaries, OBMC can be performed at a 4×4 sub-block level expect the CU boundaries. For each sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

For AMVP mode, a flag can be signaled to indicate whether to perform OBMC for a CU. For skip and merge mode, OBMC is always performed without any signaling.

In some of the disclosed embodiments, the following two changes can be applied to better handle the interaction between the LIC and the OBMC:

1) It is proposed to enable the OBMC to the inter blocks where the LIC is applied. Additionally, to achieve a better complexity/performance trade-off, the OBMC is only applied for refining the prediction samples on the top and left boundaries of one LIC CU while the OBMC on the internal sub-block boundaries are always disabled.

2) Besides the MVs, it is proposed to also take the LIC parameters of one neighboring block (when it is coded by the LIC) into consideration when generating its corresponding prediction samples for the OBMC of the current CU. So that the LIC parameters are stored in CU level.

Intra block copy (IBC) is a tool adopted in VVC. As appreciated, it may significantly improve the coding efficiency of screen content materials. Since IBC mode is implemented as a block level coding mode, block matching (BM) can be performed at the encoder to find the optimal block vector (or motion vector) for each CU. Here, a block vector can be used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation can be performed for IBC. The encoder performs RD check for blocks with either width or height no larger than 16 luma samples. For non-merge mode, the block vector search can be performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode can be signaled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

In the current ECM design, intra block copy with local illumination compensation (IBC-LIC) is a coding tool which compensates the local illumination variation within a picture between the CU coded with IBC and its reference block with a linear model. The parameters of the linear model are derived by the same method as LIC for inter prediction except that the reference template is generated using a block vector in IBC.

IBC-LIC can be applied to the IBC AMVP mode and the IBC merge mode. For the IBC AMVP mode, an IBC-LIC flag is signalled to indicate the usage of IBC-LIC. For the IBC merge mode, the IBC-LIC flag is inherited from a coded block according to the merge candidate index.

In some of the disclosed embodiments, three more modes can be added to IBC-LIC to further improve the coding performance. The first two modes are related to the template shape selection. It is proposed to allow IBC-LIC to use top-only, left-only, or both top and left templates for deriving the single model parameters. A multi-model IBC-LIC is also proposed, which allows IBC-LIC to have two linear models in one CU. And both top and left templates are used for deriving multi-model IBC-LIC parameters.

In the IBC AMVP mode, if the IBC flag is true, an IBC-LIC index can be signalled to indicate which IBC-LIC method is used as shown in Table 3.

TABLE 3

| IBC-LIC signaling | |
|---|---|
| Index | Mode |
| 00 | Original IBC-LIC (single model with top and left template) |
| 01 | Multi-models IBC-LIC |
| 10 | Top-only IBC-LIC |
| 11 | Left-only IBC-LIC |

Figure 16:
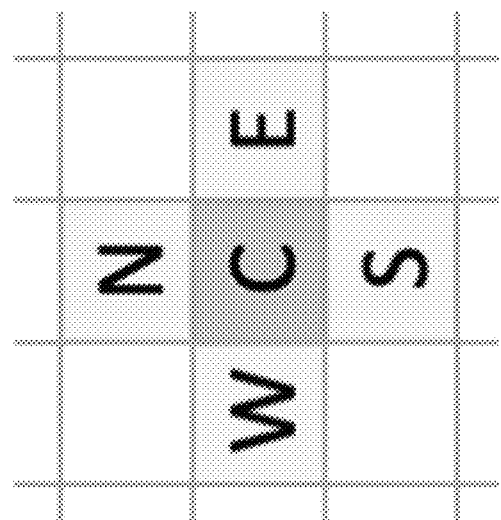
FIG. 16 is a schematic diagram illustrating an exemplary spatial part of exemplary intra block copy (IBC) filter, according to some embodiments of the present disclosure.

Next, IBC-filter is described. In ECM, a 7-tap filter consists of a 5-tap plus sign shape spatial component, a bias term and a nonlinear term. As shown in FIG. 16, the input to the spatial 5-tap component of the filter consists of a center (C) sample in the reference block which is at corresponding locations with the sample in the current block to be predicted and its above/north (N), below/south (S), left/west (W) and right/east (E) neighbors as illustrated below.

The nonlinear term P is represented as power of two of the center sample C and scaled to the sample value range of the content:

$$P = (C * C + midVal) \gg bitDepth \qquad (14)$$

The bias term B represents a scalar offset between the input and output and is set to middle luma value (512 for 10-bit content).

Output of the filter is calculated as follows:

$$predLumaVal = c0C + c1N + c2S + c3E + c4W + c5P + c6B \quad (15)$$

The filter coefficients ci are calculated by minimising the MSE between the reference template and current template.

One extra indication flag is introduced for the IBC-Filter which is signaled conditioned on the IBC-LIC flag. Specifically, when the IBC-LIC flag is true, the flag is signaled and used to indicate whether the IBC-Filter is applied to the current block or not. For IBC merge modes, this filtering mode is inherited when merge mode list is constructed, so there is no extra signaling.

In ECM, combined intra block copy and intra prediction (IBC-CIIP) is a coding tool for a CU which uses IBC and intra prediction to obtain two prediction signals, and the two prediction signals are weighted summed to generate the final prediction as follows:

$$P = (w_{ibc} * P_{ibc} + ((1 \ll shift) - w_{ibc}) * P_{intra} + (1 \ll (shift - 1))) \gg shift \quad (16)$$

wherein $P_{ibc}$ and $P_{intra}$ denote the IBC prediction signal and intra prediction signal. ($w_{ibc}$, shift) are set equal to (13, 4) and (1, 1) for IBC merge mode and IBC AMVP mode.

An intra prediction mode (IPM) candidate list is used to generate the intra prediction signal, and the IPM candidate list size is pre-defined as 2. An IPM index is signalled to indicate which IPM is used.

In ECM, intra block copy with geometry partitioning mode (IBC-GPM) is a coding tool which divides a CU into two sub-partitions geometrically. The prediction signals of the two sub-partitions are generated using IBC and intra prediction. IBC-GPM can be applied to regular IBC merge mode or IBC TM merge mode. An intra prediction mode (IPM) candidate list is constructed using the same method as GPM with inter and intra prediction for intra prediction, and the IPM candidate list size is pre-defined as 3. There are 48 geometry partitioning modes in total, which are divided into two geometry partitioning mode sets as follows:

TABLE 4

Geometry partitioning modes in the first geometry partitioning mode set in IBC-GPM

| ibc_gpm_partition_idx | 0 | 1 | 2 | 3 | 4 | 5 | 6 | 7 |
|---|---|---|---|---|---|---|---|---|
| angleIdx | 0 | 0 | 8 | 8 | 16 | 16 | 24 | 24 |
| distanceIdx | 1 | 3 | 1 | 3 | 1 | 3 | 1 | 3 |

TABLE 5

Geometry partitioning modes in the second geometry partitioning mode set in IBC-GPM

| ibc_gpm_partition_idx | 0 | 1 | 2 | 3 | 4 | 5 | 6 | 7 | 8 | 9 |
|---|---|---|---|---|---|---|---|---|---|---|
| angleIdx | 2 | 2 | 2 | 3 | 3 | 3 | 4 | 4 | 4 | 5 |
| distanceIdx | 0 | 1 | 3 | 0 | 1 | 3 | 0 | 1 | 3 | 0 |
| ibc_gpm_partition_idx | 10 | 11 | 12 | 13 | 14 | 15 | 16 | 17 | 18 | 19 |
| angleIdx | 5 | 5 | 11 | 11 | 11 | 12 | 12 | 12 | 13 | 13 |
| distanceIdx | 1 | 3 | 0 | 1 | 3 | 0 | 1 | 3 | 0 | 1 |

TABLE 5-continued

Geometry partitioning modes in the second geometry partitioning mode set in IBC-GPM

| ibc_gpm_partition_idx | 20 | 21 | 22 | 23 | 24 | 25 | 26 | 27 | 28 | 29 |
|---|---|---|---|---|---|---|---|---|---|---|
| angleIdx | 13 | 14 | 14 | 14 | 18 | 18 | 19 | 19 | 20 | 20 |
| distanceIdx | 3 | 0 | 1 | 3 | 1 | 3 | 1 | 3 | 1 | 3 |
| ibc_gpm_partition_idx | 30 | 31 | 32 | 33 | 34 | 35 | 36 | 37 | 38 | 39 |
| angleIdx | 21 | 21 | 27 | 27 | 28 | 28 | 29 | 29 | 30 | 30 |
| distanceIdx | 1 | 3 | 1 | 3 | 1 | 3 | 1 | 3 | 1 | 3 |

When IBC-GPM is used, an IBC-GPM geometry partitioning mode set flag is signalled to indicate whether the first or the second geometry partitioning mode set is selected, followed by the geometry partitioning mode index. An IBC-GPM intra flag is signalled to indicate whether intra prediction is used for the first sub-partition. When intra prediction is used for a sub-partition, an intra prediction mode index is signalled. When IBC is used for a sub-partition, a merge index is signalled.

Bi-predictive IBC GPM generates the prediction samples for both GPM partitions using the different IBCs. In the bi-predictive IBC GPM, the core IBC GPM design (e.g., 48 GPM modes, IBC merge candidate list) is kept the same as that of the uni-predictive IBC GPM in ECM. Here, the uni-predictive IBC GPM generates the prediction samples for each GPM partition using the IBC and intra mode, respectively.

Next, bi-predictive IBC is described. IBC BVP-merge, inspired by AMVP-merge, derives the two required BVs from IBC block vector prediction (BVP) and IBC merge. Two different indices for the IBC BVP and the IBC merge candidates are signalled from the encoder to the decoder, different from the AMVP-merge mode.

Bi-predictive IBC merge derives the two BVs from the existing IBC merge candidate list, utilizing two different indices. The two indices are signaled from the encoder to the decoder. The target of the bi-predictive IBC merge is IBC MBVD and IBC regular merge. In the current ECM, IBC-LIC and IBC-filter are not applied to IBC-CIIP, IBC-GPM and bi-predictive IBC.

Conventional LIC methods, however, have some problems. As can be appreciated, while the conventional LIC method described above can compensate illumination changes between different pictures locally, it is not applied to GPM. Therefore, GPM cannot be benefited from the LIC. Second, the conventional LIC method only derives one linear model for all samples in the current block, which may lead to lower prediction accuracy. Third, for bi-predictive blocks, if the LIC flag is true, the conventional LIC method must be applied to both uni-prediction blocks, which lacks flexibility. Fourth, IBC-LIC and IBC-filter are not applied to IBC-CIIP, IBC-GPM and bi-predictive IBC.

According to the disclosed embodiments, to solve one or more of the above problems associated with the LIC methods, the LIC method can be applied to the GPM coded unit.

Figure 17A:
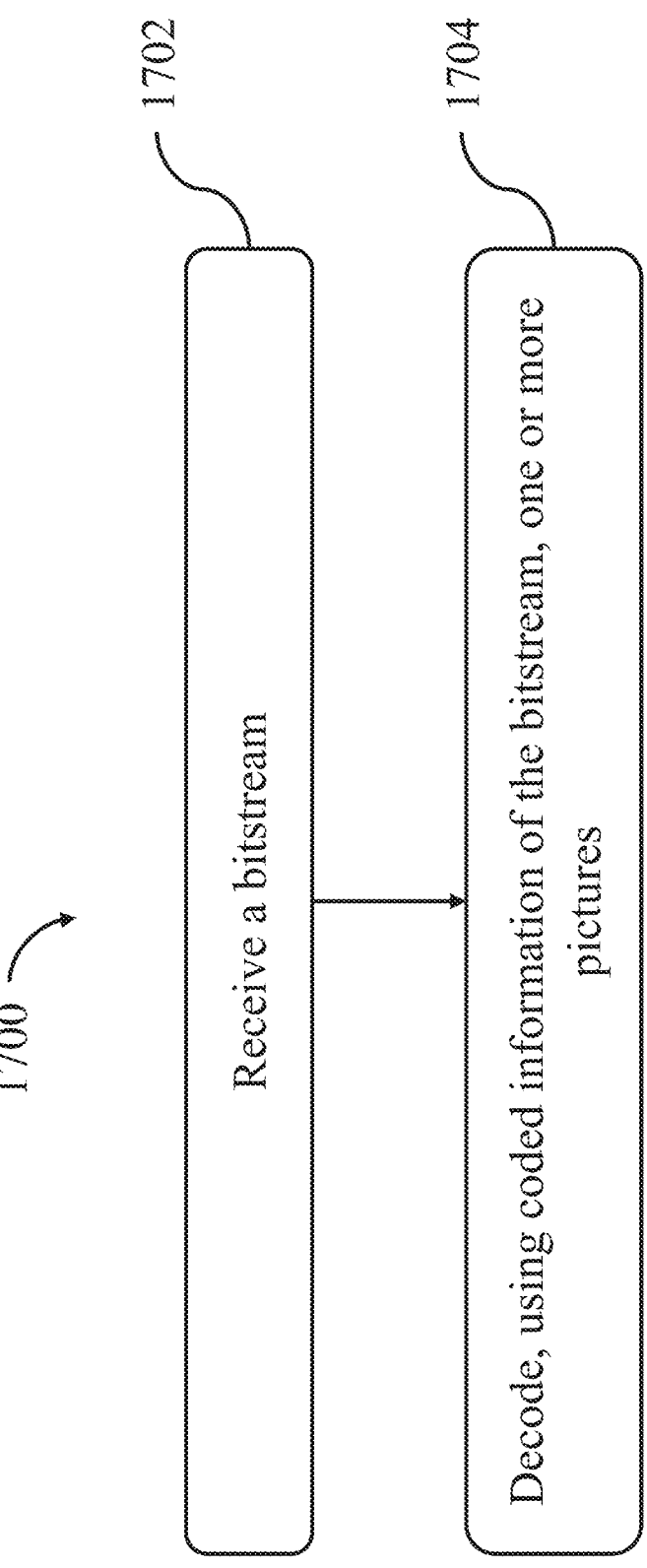
FIG. 17A is a schematic diagram illustrating an exemplary method for decoding a bitstream, according to some embodiments of the present disclosure.

Some embodiments of the present disclosure provide a method of decoding a bitstream. FIG. 17A is a schematic diagram illustrating an exemplary method 1700 for decoding a bitstream, according to some embodiments of the present disclosure. As shown in FIG. 17A, method 1700 may include steps 1702 and 1704, which can be implemented by one or more processors associated with a decoder (e.g., image/video decoder 144 in FIG. 1, a decoder being consistent with decoding process 300A shown in FIG. 3A, a decoder being consistent with decoding process 300B shown in FIG. 3B, or apparatus 400 in FIG. 4).

In step 1702, the decoder may receive a bitstream.

In step 1704, the decoder may decode one or more pictures using coded information of the bitstream. Specifically, the decoder may determine whether to apply a local illumination compensation (LIC) process to a current block of a current picture among the one or more pictures.

FIG. 17B is a flow chart illustrating sub-steps of method 1700 shown in FIG. 17A, according to some embodiments of the present disclosure. As shown in FIG. 17B, step 1704 may include sub-steps 1710 and 1712, which can be implemented by the decoder.

In sub-step 1710, the decoder may determine whether a current block of a current picture is coded by partitioning into multiple parts. In some embodiments, the current block can be partitioned in a geometric partitioning mode (GPM) by dividing the current block into two GPM partitioning parts. In some embodiments, the current picture can be coded with an angular weighted prediction (AWP) mode. While some embodiments of the present disclosure are described in connection with GPM, it is appreciated that such method can be applied to AWP.

In sub-step 1712, in response to a determination that the current block is partitioned into multiple parts that are inter predicted according to respective reference blocks in sub-step 1710, the decoder may determine whether to apply a local illumination compensation (LIC) process to the multiple parts based on whether a coded block in the current picture applies the LIC process.

In some embodiments, when a coding unit is coded in GPM mode, the LIC flag can be inherited from a coded block for each GPM partition part. Specifically, in sub-step 1712, the decoder may determine whether to apply the LIC process to a target GPM partitioning part of the two GPM partitioning parts based on whether a causally neighboring block of the current block applies the LIC process. In some embodiments, the causally neighboring block can be a block corresponding to the merge index of the target GPM partitioning part.

In some embodiments, for the first GPM partition part, a first LIC flag can be inherited from a first already coded block (e.g., causally neighboring block) in the current picture corresponding to the first merge index. Similarly, for the second GPM partition part, a second LIC flag can be inherited from a second already coded block (e.g., causally neighboring block) in the current picture corresponding to the second merge index. Then, for each part, if the inherited LIC flag is true, the LIC process is applied.

With further reference to FIG. 17B, in some embodiments, step 1704 further includes a sub-step 1714, which can also be implemented by the decoder. In sub-step 1714, in response to a determination that applying the LIC process to the target GPM partitioning part, the decoder may determine LIC parameters for the target GPM partitioning part.

Figure 18A:
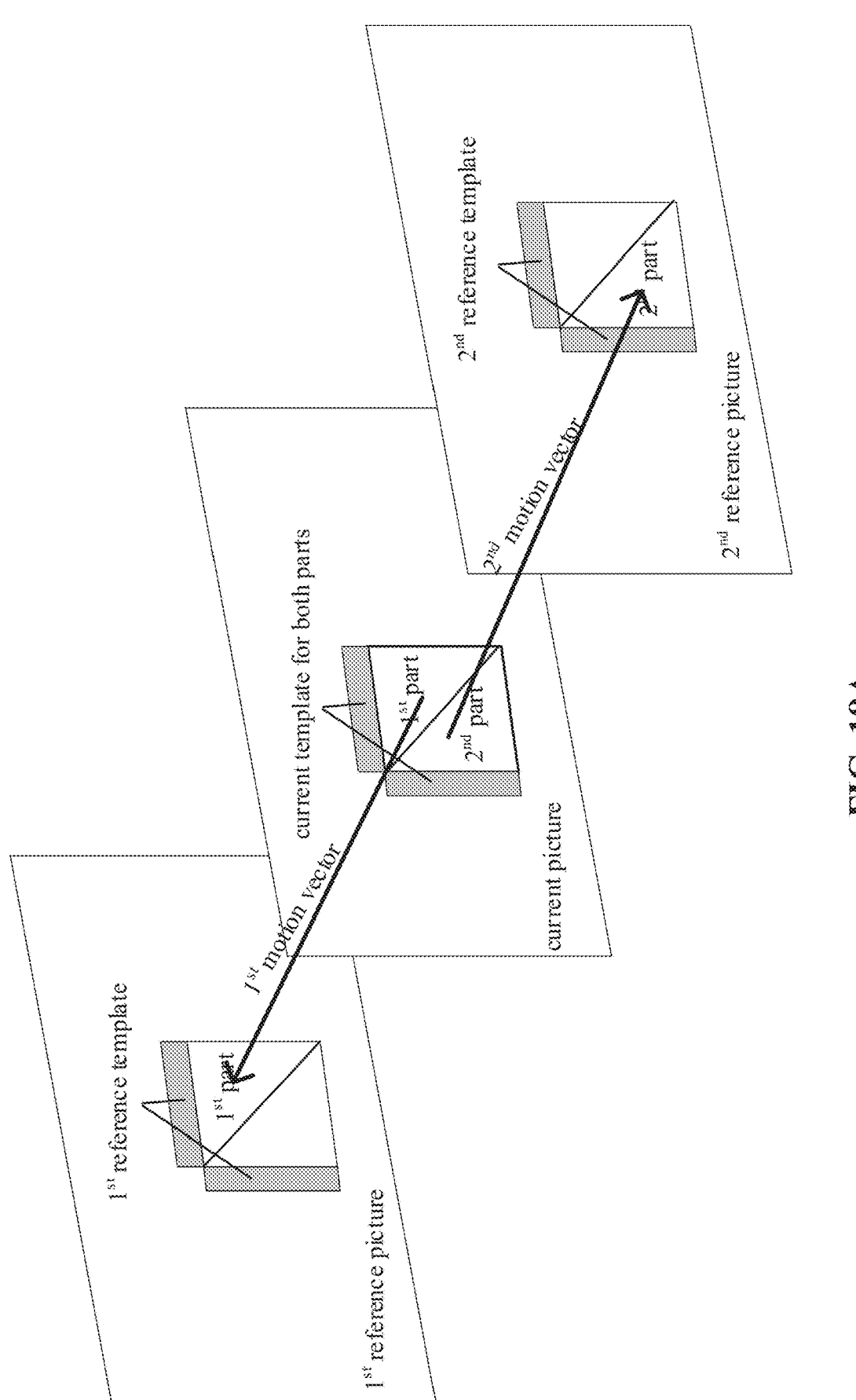
FIG. 18A is a schematic diagram illustrating exemplary templates for GPM-LIC, according to some embodiments of the present disclosure.

In some embodiments, the LIC parameters for the target GPM partitioning part are determined based on a current template of the current block and a reference template of the reference block. For example, as shown in FIG. 18A, the LIC process may include deriving LIC parameters based on the current template and the reference template (e.g., $1^{st}$ reference template or $2^{nd}$ reference template shown in FIG. 18A) and adjusting the predicted values of the current part (e.g., $1^{st}$ part or $2^{nd}$ part shown in FIG. 18A) after MC based on the LIC parameters. When deriving the LIC parameters, the template can be constructed from both left and above available neighboring samples. Finally, the adjusted predicted values of two parts by LIC are blended to generate the final predicted values of the current coding unit.

In some embodiments, if a GPM partition part is uni-predictive and the inherited LIC flag is true, the above-described LIC methods for uni-predictive blocks can be used. In some embodiments, if a GPM partition part is bi-predictive and the inherited LIC flag is true, the above-described LIC methods for bi-predictive blocks can be used.

In some embodiments, step 1704 further includes a sub-step 1716, which can also be implemented by the decoder. In sub-step 1716, in response to a determination that applying the LIC process to the target GPM partitioning part and the target GPM partitioning part being bi-predicted, the decoder may skip decoder-side motion vector refinement (DMVR) or bi-directional optical flow (BDOF) towards the target GPM partitioning part. For example, if a GPM partition part is bi-predictive and the inherited LIC flag is true, DMVR (including multi-pass DMVR, adaptive DMVR and affine DMVR) and BDOF is not applied. The decoder may skip these processes.

In some embodiments, if a GPM partition part is bi-predictive and DMVR or BDOF condition is satisfied, the LIC flag for this part can be set to false (e.g., zero), which means LIC is not applied.

In some embodiments, if a GPM partition part is bi-predictive, the LIC flag for this part can be set to false (e.g., zero). That is the LIC method is not applied to bi-predictive GPM partition part.

In some embodiments, the LIC method can only be applied to GPM coded blocks for low delay pictures.

Figure 18B:
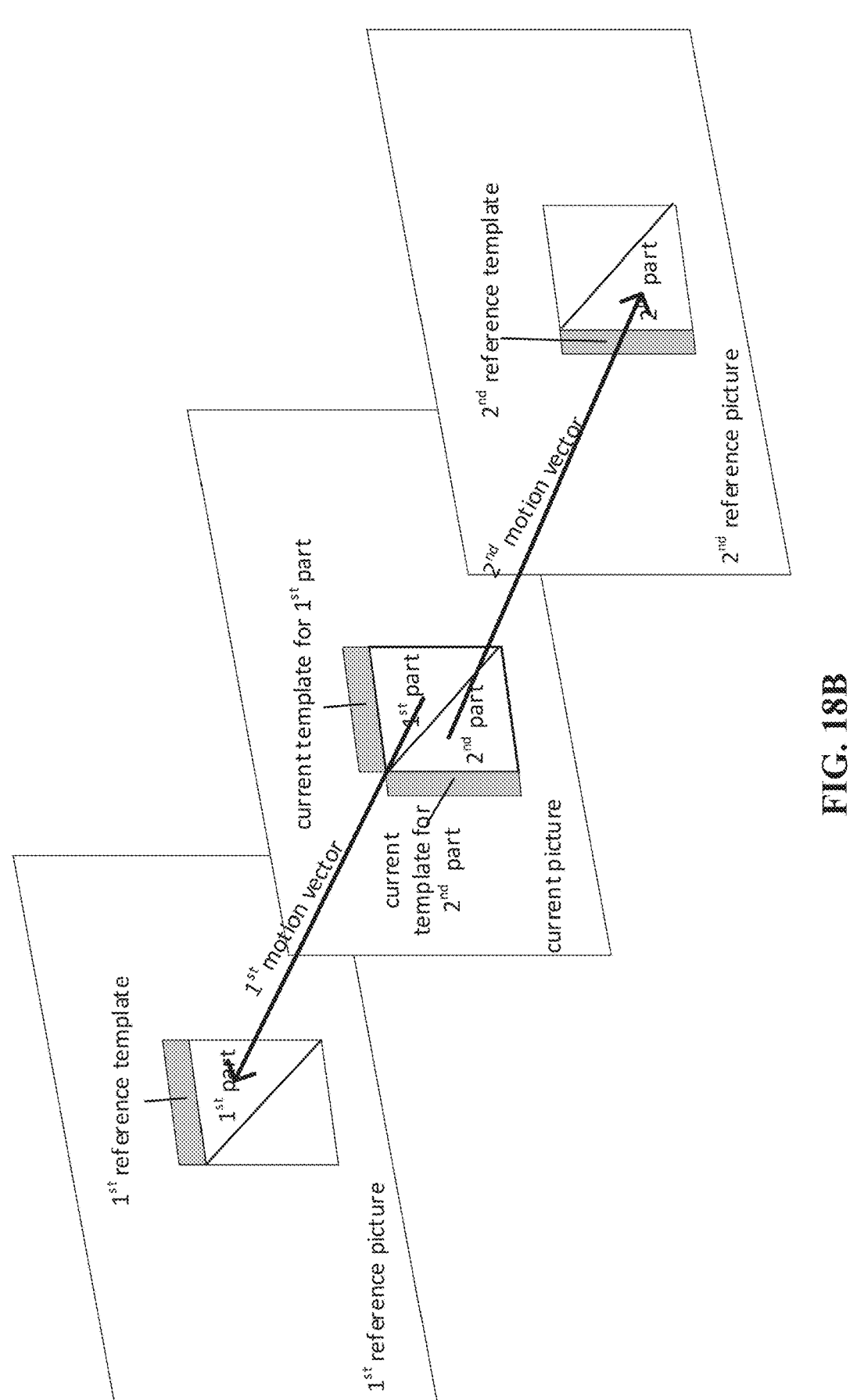
FIG. 18B is a schematic diagram illustrating exemplary templates for GPM-LIC, according to some embodiments of the present disclosure.

In some embodiments, when deriving LIC parameters, each GPM partition part can construct the template based on GPM partition angles, respectively. As shown in Table 1, there are in total 64 split modes which contain 20 angles and 4 distances. For example, as shown in FIG. 18B, where only the top template is used for the LIC parameters deriving for the first part and only the left template is used for the LIC parameters deriving for the second part.

In some embodiments, when deriving LIC parameters of a GPM partition part, it firstly selects template from one of the left neighbor, top neighbor, or left and top neighbor according to the partition angle. The basic principle for the template selection is that, if the partition only has top neighboring samples, the top neighbor is selected as template; otherwise, if the partition only has left neighboring samples, the left neighbor is selected as template; otherwise, the left and top neighbor is selected as template. Specifically, for partition angle 0, 2, 3, 13, 14, 16, 18, 19, 29 and 30, the top neighbor is selected as template for the first part that is predicted using the first motion, and the left and top neighbor is selected as template for the second part that is predicted using the second motion. For partition angle 4 and 20, the top neighbor is selected as template for the first part, and the left neighbor is selected as template for the second part. For partition angle 5, 8, 11, 21, 24 and 27, the left and top neighbor is selected as template for the first part, and the left neighbor is selected as template for the second partition. For partition angle 12 and 28, the left and top neighbor is selected as template for the first and the second parts.

In some embodiments, the inherited LIC flag for each GPM partition part is considered in GPM TM and GPM split mode reorder. When doing GPM TM or GPM split mode reorder, after MC of the reference template, if the inherited LIC flag is true, the LIC process is applied to the reference template, then the TM cost between the current template and reference template are calculated. The LIC parameters are derived based on the current template and reference template, and the reference template after MC is adjusted by the derived LIC parameters.

In some embodiments, LIC parameters can be stored for the whole CU. For example, for a GPM coded CU, if LIC is applied to only one GPM partition part, the LIC parameters of the part are stored for the whole CU; if LIC is applied to both GPM partition parts, only one of the two sets of LIC parameters for the two parts are selected based on the GPM split mode and stored for the whole CU. For example, the LIC parameters of the part which has a larger area in the CU are selected. The stored LIC parameters can be used for OBMC for neighboring CUs.

In some embodiments, for a GPM coded CU, if LIC is applied, the LIC parameters are stored in sub-block level. For example, the sub-block size can be 4×4 or 1×1. If LIC is applied to both GPM partition parts, for a position in the CU, which of the two sets of LIC parameters are stored is decided based on which part the position belongs to. The stored LIC parameters can be used for OBMC for neighboring CUs.

In some embodiments, the LIC is applied to GPM intra inter mode coded blocks. For the current block, a LIC flag can be inherited from the coded block in the current picture based on the merge index. If the LIC flag is true, the LIC is applied to the inter prediction block in GPM intra inter mode. Then the inter prediction block after adjusted by LIC are blended with the intra prediction block to generate the final prediction.

As mentioned above, the methods of applying the LIC to GPM can also be applied to AWP mode in AVS3 standard.

According to some of the disclosed embodiments, to solve one or more of the above problems associated with the LIC methods, a multi-model LIC method can be used.

Figure 19:
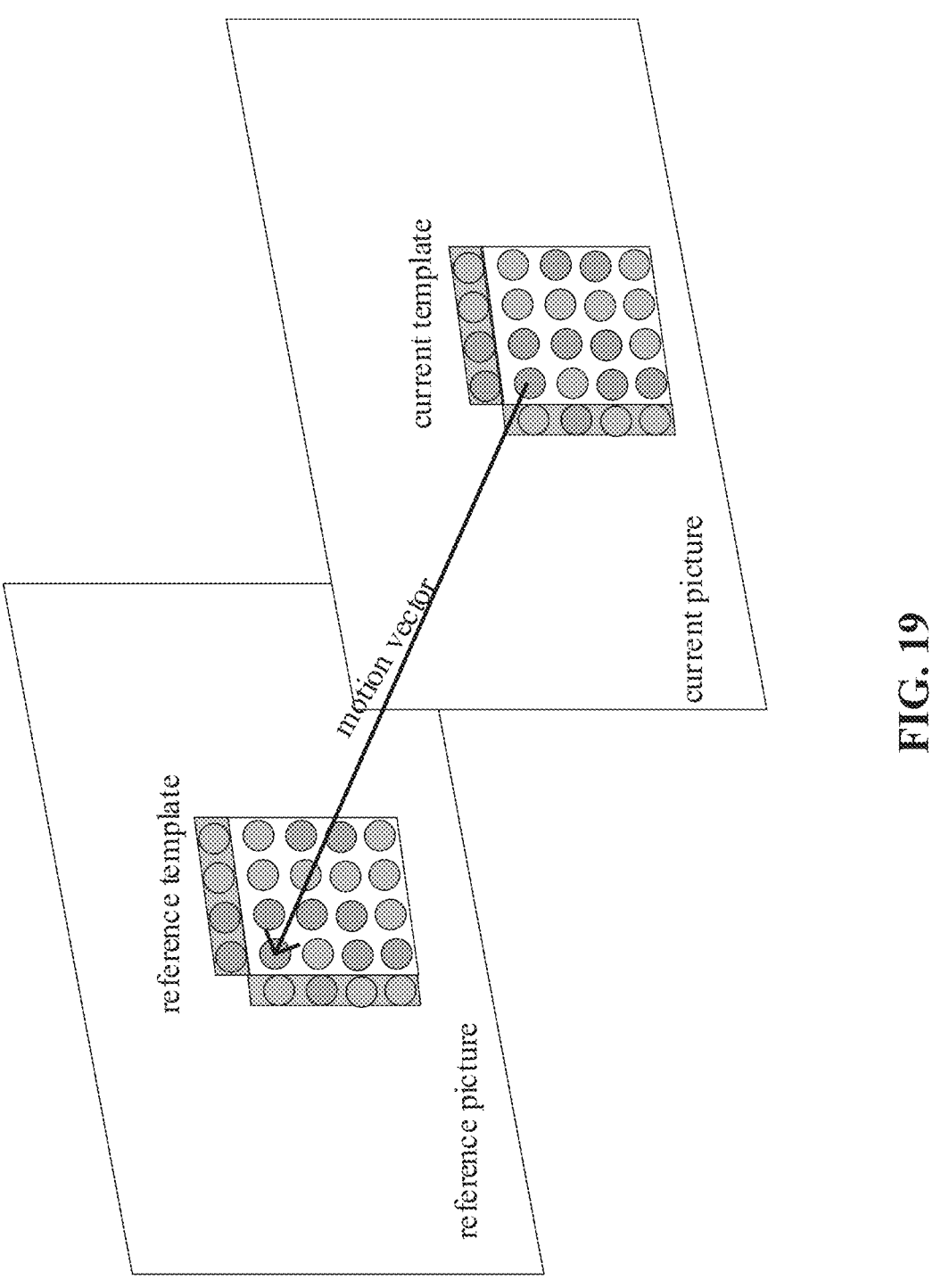
FIG. 19 is a schematic diagram illustrating an exemplary multi-model LIC, according to some embodiments of the present disclosure.

In some embodiments, when applying LIC method to a coding unit, two LIC models (two sets of LIC parameters) can be derived and applied. A threshold is determined. For example, the threshold can be the average value of the samples in the reference template after MC. For another example, the threshold can be the average value of the predicted samples in the current block after MC. The samples in reference template are classified into two classes based on the values of the samples after MC and the threshold. For a sample in the reference template, if the value after MC is smaller than (or equal to) the threshold, the sample is fall into a first class, otherwise the sample is fall into a second class. In some embodiments, two LIC models can be derived based on the samples in the two classes, respectively. For the current block, the samples are also classified based on the predicted values after MC and the threshold in the same rule. For a sample in the current block, if the predicted value after MC is smaller than (or equal to) the threshold, the sample is fall into the first class, and the first LIC model is applied to adjust the predicted value; otherwise the sample is fall into the second class, and the second LIC model is applied to adjust the predicted value. For example, in FIG. 19, the bule samples in the template are used to derive the first LIC model which is applied to the blue samples in the current block to adjust the predicted values; and the green samples in the template are used to derive the second LIC model which is applied to the green samples in the current block.

In some embodiments, the multi-model method can be used for bi-predictive LIC. In one example, the two uni-prediction blocks in a bi-predictive block should have the same number of LIC models. For example, both uni-prediction blocks are adjusted by multi-model LIC. This can be decided by a flag as shown in Table 6. In one example, the two uni-prediction blocks in a bi-predictive block can have different numbers of LIC models. For example, one uni-prediction block is adjusted by single model LIC, and the other uni-prediction block is adjusted by multi-model LIC. This can be decided by an index as shown in Table 7. In some embodiments, the multi-model method can not be used for bi-predictive LIC.

TABLE 6

| The number of LIC models for the two predictions in bi-predictive LIC in one example. | | |
|---|---|---|
| flag | L0 prediction | L1 prediction |
| 0 | Single model LIC | Single model LIC |
| 1 | Multi-model LIC | Multi-model LIC |

TABLE 7

| The number of LIC models for the two predictions in bi-predictive LIC in another example. | | |
|---|---|---|
| index | L0 prediction | L1 prediction |
| 0 | Single model LIC | Single model LIC |
| 1 | Multi-model LIC | Multi-model LIC |
| 2 | Single model LIC | Multi-model LIC |
| 3 | Multi-model LIC | Single model LIC |

In some embodiments, the multi-model method can be used for coding unit whose size (width×height) is greater than a threshold. For example, the threshold can be equal to 32, 64, 128, 256, or 512.

In some embodiments, for an AMVP mode coded block, if LIC flag is true, a second flag is signalled to indicate whether single model LIC or multi-model LIC is applied. For merge mode coded block, if the inherited LIC flag is true, the second flag can also be inherited from a coded block to decide whether single model LIC or multi-model LIC is applied. In some embodiments, for merge mode coded block, if the inherited LIC flag is true, the second flag can not be inherited from the coded block, which means only single model LIC can be applied to merge mode coded block.

In some embodiments, if LIC flag is true, whether to use single model LIC or multi-model LIC is decided based on the template. For example, both single model LIC and multi-model LIC are applied to the template, and the method with smaller TM cost (the cost between the current template and the reference template after applying the two LIC methods) is used for the current block.

According to the disclosed embodiments, to solve one or more of the above problems associated with the LIC methods, bi-LIC can be improved, as follows.

In the current ECM, for AMVP bi-predictive CUs, a LIC flag is signalled to indicate whether LIC is applied to both uni-prediction blocks. For merge bi-predictive CUs, a LIC flag is inherited from coded blocks to decided whether LIC is applied to both uni-prediction blocks.

In some embodiments, for bi-predictive CUs, the LIC can only be applied to one of the two uni-prediction blocks. For AMVP bi-predictive CUs, if the LIC flag is true, an index is further signalled to indicate whether LIC is applied to both uni-prediction blocks or only one of the two uni-prediction blocks as shown in Table 8. For merge bi-predictive CUs, if the inherited LIC flag is true, the index is also inherited from coded block to decide whether LIC is applied to both uni-prediction blocks or only one of the two uni-prediction blocks.

TABLE 8

The number of LIC models for the two predictions in bi-predictive LIC in another example.

| index | L0 prediction | L1 prediction |
|-------|---------------|---------------|
| 0 | Apply LIC | Apply LIC |
| 1 | Apply LIC | Not apply LIC |
| 2 | Not apply LIC | Apply LIC |

According to the disclosed embodiments, to solve one or more of the above problems associated with the LIC methods, IBC-LIC and IBC-filter can be improved, as follows.

Specifically, in this disclosure, it is proposed to apply IBC-LIC and/or IBC-Filter to IBC-CIIP, IBC-GPM, and bi-predictive IBC.

In some embodiments, the IBC-LIC is applied to IBC-CIIP mode. If the IBC part of the IBC-CIIP is coded by an AMVP mode, a flag is signalled to indicate whether IBC-LIC is applied to the IBC prediction block. If the IBC part of the IBC-CIIP is coded by a merge mode, an IBC-LIC flag can be inherited from the coded block in the current picture based on the merge index. If the IBC-LIC flag is true, the IBC prediction block after adjusted by IBC-LIC and the intra prediction block are weighted summed to generate the final prediction. In some embodiments, the IBC-LIC is only applied to IBC-CIIP mode when the IBC part is coded by a merge mode.

In some embodiments, the IBC-LIC is applied to IBC-GPM mode. For uni-IBC-GPM mode (IBC prediction+intra prediction), an IBC-LIC flag can be inherited from the coded block in the current picture based on the merge index. If the IBC-LIC flag is true, the IBC-LIC is applied to the IBC prediction. Then the IBC prediction block after adjusted by IBC-LIC are blended with the intra prediction block to generate the final prediction. For bi-IBC-GPM mode, two LIC flags are inherited from coded blocks in the current picture based on the two merge indices of the two parts, respectively. For each part, if the LIC flag is true, the LIC is applied to the prediction of that part. Then the predictions of the two parts are blended to generate the final prediction.

In some embodiments, the IBC-LIC is applied to bi-predictive IBC merge mode. Two LIC flags are inherited from coded blocks in the current picture based on the two merge indices, respectively. For each uni-prediction, if the LIC flag is true, the LIC is applied to the prediction. Then the two uni-predictions are weighted summed to generate the final prediction.

In some embodiments, if the inherited IBC-LIC flag is true, the single model IBC-LIC method with both top and left template is applied to the current block. In some embodiments, if the inherited IBC-LIC flag is true, an IBC-LIC index which indicates which of the four IBC-LIC methods as shown in Table 3 is also inherited. And the IBC-LIC method corresponding to the inherited IBC-LIC index is applied to the current block.

In some embodiments, the IBC-Filter flag can be inherited in IBC-CIIP, IBC-GPM and bi-predictive IBC merge mode in the same way as described above.

It is noted that the embodiments described in the present disclosure can be freely combined.

Figure 20A:
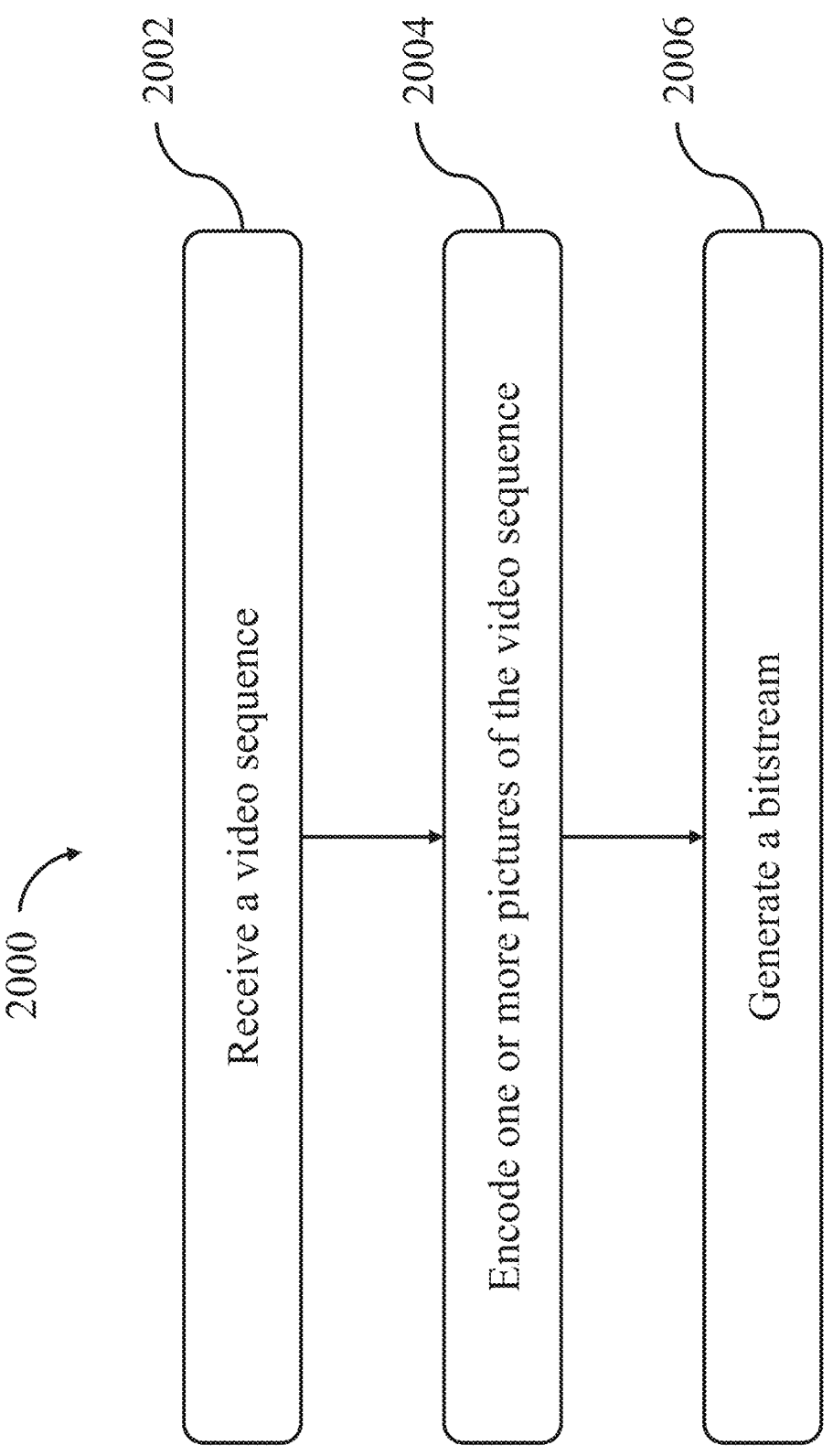
FIG. 20A is a schematic diagram illustrating an exemplary method for encoding a video sequence into a bitstream, according to some embodiments of the present disclosure.

In some embodiments, a method of encoding a video sequence into a bitstream is also provided. FIG. 20A is a schematic diagram illustrating an exemplary method 2000 for encoding a video sequence into a bitstream, according to some embodiments of the present disclosure. As shown in FIG. 20A, method 2000 may include steps 2002 to 2006, which can be implemented by one or more processors associated with an encoder (e.g., image/video encoder 124 in FIG. 1, an encoder being consistent with encoding process 200A shown in FIG. 2A, an encoder being consistent with encoding process 200B shown in FIG. 2B, or apparatus 400 in FIG. 4).

In step 2002, the encoder may receive a video sequence.

In step 2004, the encoder may encode one or more pictures of the video sequence. Specifically, the encoder may determine whether to apply a local illumination compensation (LIC) process to a current block of a current picture among the one or more pictures.

In step 2006, the encoder may generate a bitstream associated with the encoded pictures. The bitstream may include the encoded results generated in step 2004.

Figure 20B:
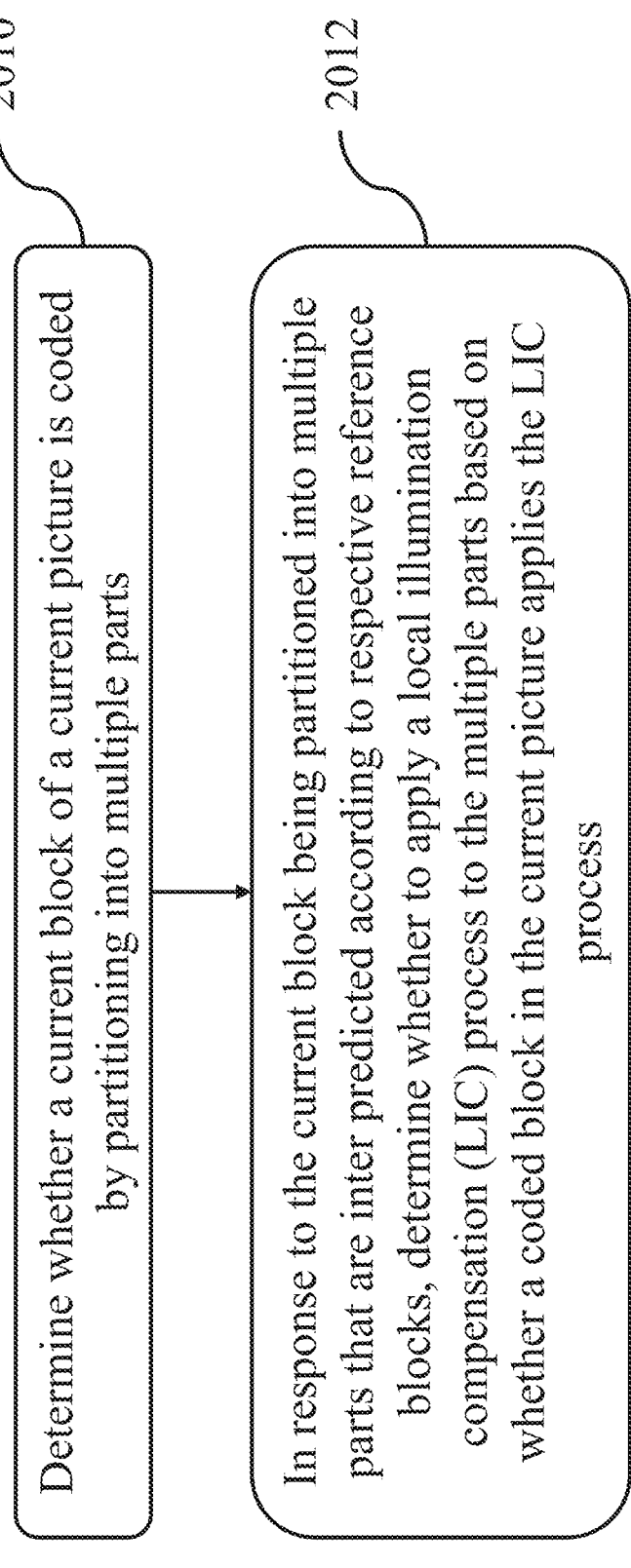
FIG. 20B is a schematic diagram illustrating sub-steps of the exemplary method shown in FIG. 20A, according to some embodiments of the present disclosure.

FIG. 20B is a schematic diagram illustrating sub-steps of method 2000 shown in FIG. 20A, according to some embodiments of the present disclosure. In some embodiments, encoding one or more pictures of the video sequence in step 2004 may include following sub-steps 2010 and 2012 as shown in FIG. 20B, which can be implemented by the encoder.

In sub-step 2010, the encoder may determine whether a current block of a current picture is coded by partitioning into multiple parts. In some embodiments, the current picture can be coded with an angular weighted prediction (AWP) mode. While some embodiments of the present disclosure are described in connection with GPM, it is appreciated that such method can be applied to AWP.

In sub-step 2012, in response to a determination that the current block is partitioned into multiple parts that are inter predicted according to respective reference blocks in sub-step 2010, the encoder may determine whether to apply a local illumination compensation (LIC) process to the multiple parts based on whether a coded block in the current picture applies the LIC process.

As can be appreciated, other aspects of method 2000 can be inherited from some of the above decoding methods when applicable. The description of such methods is not included herein for abbreviation.

In some embodiments, a non-transitory computer-readable storage medium storing a bitstream is also provided. The bitstream can be encoded and decoded according to the disclosed local illumination compensation method.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method of decoding a bitstream to output one or more pictures for a video stream, the method including:
   receiving a bitstream; and
   decoding, using coded information of the bitstream, one or more pictures, wherein the decoding includes:

determining whether a current block of a current picture is coded by partitioning into multiple parts; and in response to the current block being partitioned into multiple parts, determining whether to apply a local illumination compensation (LIC) process to the multiple parts based on whether a coded block applies the LIC process.

2. The method of clause 1, wherein the current block is partitioned in a geometric partitioning mode (GPM) by dividing the current block into two GPM partitioning parts.

3. The method of clause 2, wherein determining whether to apply the LIC process to the multiple parts includes:

determining whether to apply the LIC process to a target GPM partitioning part of the two GPM partitioning parts based on whether a causally neighboring block of the current block applies the LIC process.

4. The method of clause 3, wherein the causally neighboring block is a block corresponding to a merge index of the target GPM partitioning part.

5. The method of clause 3, further including:

in response to a determination that applying the LIC process to the target GPM partitioning part, determining LIC parameters for the target GPM partitioning part.

6. The method of clause 5, wherein the LIC parameters for the target GPM partitioning part are determined based on a current template of the current block and a reference template of a reference block.

7. The method of clause 6, wherein the current template includes left neighboring sample and above neighboring sample of the current block, and the reference template includes left neighboring sample and above neighboring sample of the reference block.

8. The method of clause 6, wherein the current template is a left neighboring sample of the current block and the reference template is a left neighboring sample of the reference block;

the current template is an above neighboring sample of the current block and the reference template is an above neighboring sample of the reference block; or the current template includes the left neighboring sample and the above neighboring sample of the current block, and the reference template includes the left neighboring sample and the above neighboring sample of the reference block.

9. The method of clause 5, further including:

storing, for a subblock including the target GPM partitioning part, the LIC parameters of the target GPM partitioning part.

10. The method of any of clauses 3 to 9, wherein the target GPM partitioning part is uni-predicted or bi-predicted.

11. The method of any of clauses 3 to 10, further including:

in response to a determination that applying the LIC process to the target GPM partitioning part and the target GPM partitioning part being bi-predicted, skipping decoder-side motion vector refinement (DMVR) or bi-directional optical flow (BDOF) towards the target GPM partitioning part.

12. The method of any of clauses 3 to 11, wherein determining whether to apply the LIC process to the multiple parts includes:

in response to a determination that the target GPM partitioning part being bi-predicted and applying decoder-side motion vector refinement (DMVR) or bi-directional optical flow (BDOF) towards the target GPM partitioning part, determining not to apply the LIC process to the target GPM partitioning part.

13. The method of any of clauses 3 to 12, wherein determining whether to apply the LIC process to the multiple parts includes:

in response to a determination that the target GPM partitioning part being bi-predicted, determining not to apply the LIC process to the target GPM partitioning part.

14. The method of any of clauses 3 to 13, further including:

in response to a determination that applying the LIC process to the target GPM partitioning part, inheriting a LIC flag from the causally neighboring block for GPM Template Matching (TM) or GPM split mode reorder towards the target GPM partitioning part.

15. The method of any of clauses 2 to 14, further including:

in response to a determination that applying the LIC process to a target GPM partitioning part of the two GPM partitioning parts:

determining LIC parameters for the target GPM partitioning part; and storing, for the current block, the LIC parameters of target GPM partitioning part; or in response to a determination that applying the LIC process to both of the two GPM partitioning parts:

determining LIC parameters for one of the two GPM partitioning parts; and storing, for the current block, the LIC parameters of the one of the two GPM partitioning parts.

16. The method of any of clauses 2 to 15, wherein the current block is a GPM intra inter 17. The method of any of clauses 1 to 16, wherein the current picture is coded with an angular weighted prediction (AWP) mode.

18. A method of encoding a video sequence into a bitstream, the method including:

receiving a video sequence;

encoding one or more pictures of the video sequence; and generating a bitstream, wherein the encoding includes:

determining whether a current block of a current picture is coded by partitioning into multiple parts; and in response to the current block being partitioned into multiple parts that are inter predicted according to respective reference blocks, determining whether to apply a local illumination compensation (LIC) process to the multiple parts based on whether a coded block applies the LIC process.

19. The method of clause 18, wherein the current block is partitioned in a geometric partitioning mode (GPM) by dividing the current block into two GPM partitioning parts.

20. The method of clause 19, wherein determining whether to apply the LIC process to the multiple parts includes:

determining whether to apply the LIC process to a target GPM partitioning part of the two GPM partitioning parts based on whether a causally neighboring block of the current block applies the LIC process.

21. The method of clause 20, wherein the causally neighboring block is a block corresponding to a merge index of the target GPM partitioning part.

22. The method of clause 20, further including:

in response to a determination that applying the LIC process to the target GPM partitioning part, determining LIC parameters for the target GPM partitioning part.

23. The method of clause 22, wherein the LIC parameters for the target GPM partitioning part are determined based on a current template of the current block and a reference template of a reference block.

24. The method of clause 23, wherein the current template includes left neighboring sample and above neighboring sample of the current block, and the reference template includes left neighboring sample and above neighboring sample of the reference block.

25. The method of clause 23, wherein the current template is a left neighboring sample of the current block and the reference template is a left neighboring sample of the reference block; the current template is an above neighboring sample of the current block and the reference template is an above neighboring sample of the reference block; or the current template includes the left neighboring sample and the above neighboring sample of the current block, and the reference template includes the left neighboring sample and the above neighboring sample of the reference block.

26. The method of clause 22, further including:

storing, for a subblock including the target GPM partitioning part, the LIC parameters of the target GPM partitioning part.

27. The method of any of clauses 20 to 26, wherein the target GPM partitioning part is uni-predicted or bi-predicted.

28. The method of any of clauses 20 to 27, further including:

in response to a determination that applying the LIC process to the target GPM partitioning part and the target GPM partitioning part being bi-predicted, skipping decoder-side motion vector refinement (DMVR) or bi-directional optical flow (BDOF) towards the target GPM partitioning part.

29. The method of any of clauses 20 to 28, wherein determining whether to apply the LIC process to the multiple parts includes:

in response to a determination that the target GPM partitioning part being bi-predicted and applying decoder-side motion vector refinement (DMVR) or bi-directional optical flow (BDOF) towards the target GPM partitioning part, determining not to apply the LIC process to the target GPM partitioning part.

30. The method of any of clauses 20 to 29, wherein determining whether to apply the LIC process to the multiple parts includes:

in response to a determination that the target GPM partitioning part being bi-predicted, determining not to apply the LIC process to the target GPM partitioning part.

31. The method of any of clauses 20 to 30, further including:

in response to a determination that applying the LIC process to the target GPM partitioning part, inheriting a LIC flag from the causally neighboring block for GPM Template Matching (TM) or GPM split mode reorder towards the target GPM partitioning part.

32. The method of any of clauses 19 to 31, further including:

in response to a determination that applying the LIC process to a target GPM partitioning part of the two GPM partitioning parts:

determining LIC parameters for the target GPM partitioning part; and storing, for the current block, the LIC parameters of target GPM partitioning part; or in response to a determination that applying the LIC process to both of the two GPM partitioning parts:

determining LIC parameters for one of the two GPM partitioning parts; and storing, for the current block, the LIC parameters of the one of the two GPM partitioning parts.

33. The method of any of clauses 19 to 32, wherein the current block is a GPM intra inter 34. The method of any of clauses 18 to 33, wherein the current picture is coded with an angular weighted prediction (AWP) mode.

35. A non-transitory computer readable storage medium storing a bitstream of a video for processing according to a method including:

determining whether a current block is coded by partitioning into multiple parts; and in response to the current block being partitioned into multiple parts that are inter predicted according to respective reference blocks, determining whether to apply a local illumination compensation (LIC) process to the multiple parts based on whether a coded block applies the LIC process.

36. The non-transitory computer readable storage medium of clause 35, wherein the current block is partitioned in a geometric partitioning mode (GPM) by dividing the current block into two GPM partitioning parts.

37. The non-transitory computer readable storage medium of clause 36, wherein determining whether to apply the LIC process to the multiple parts includes:

determining whether to apply the LIC process to a target GPM partitioning part of the two GPM partitioning parts based on whether a causally neighboring block of the current block applies the LIC process.

38. The non-transitory computer readable storage medium of clause 37, wherein the causally neighboring block is a block corresponding to a merge index of the target GPM partitioning part.

39. The non-transitory computer readable storage medium of clause 37, wherein the method further includes:

in response to a determination that applying the LIC process to the target GPM partitioning part, determining LIC parameters for the target GPM partitioning part.

40. The non-transitory computer readable storage medium of clause 39, wherein the LIC parameters for the target GPM partitioning part are determined based on a current template of the current block and a reference template of a reference block.

41. The non-transitory computer readable storage medium of clause 40, wherein the current template includes left neighboring sample and above neighboring sample of the current block, and the reference template includes left neighboring sample and above neighboring sample of the reference block.

42. The non-transitory computer readable storage medium of clause 40, wherein the current template is a left neighboring sample of the current block and the reference template is a left neighboring sample of the reference block;

the current template is an above neighboring sample of the current block and the reference template is an above neighboring sample of the reference block; or the current template includes the left neighboring sample and the above neighboring sample of the current block, and the reference template includes the left neighboring sample and the above neighboring sample of the reference block.

43. The non-transitory computer readable storage medium of clause 39, wherein the method further includes:

storing, for a subblock including the target GPM partitioning part, the LIC parameters of the target GPM partitioning part.

44. The non-transitory computer readable storage medium of any of clauses 37 to 43, wherein the target GPM partitioning part is uni-predicted or bi-predicted.

45. The non-transitory computer readable storage medium of any of clauses 37 to 44, wherein the method further includes:

in response to a determination that applying the LIC process to the target GPM partitioning part and the target GPM partitioning part being bi-predicted, skipping decoder-side motion vector refinement (DMVR) or bi-directional optical flow (BDOF) towards the target GPM partitioning part.

46. The non-transitory computer readable storage medium of any of clauses 37 to 45, wherein determining whether to apply the LIC process to the multiple parts includes:

in response to a determination that the target GPM partitioning part being bi-predicted and applying decoder-side motion vector refinement (DMVR) or bi-directional optical flow (BDOF) towards the target GPM partitioning part, determining not to apply the LIC process to the target GPM partitioning part.

47. The non-transitory computer readable storage medium of any of clauses 37 to 46, wherein determining whether to apply the LIC process to the multiple parts includes:

in response to a determination that the target GPM partitioning part being bi-predicted, determining not to apply the LIC process to the target GPM partitioning part.

48. The non-transitory computer readable storage medium of any of clauses 37 to 47, wherein the method further includes:

in response to a determination that applying the LIC process to the target GPM partitioning part, inheriting a LIC flag from the causally neighboring block for GPM Template Matching (TM) or GPM split mode reorder towards the target GPM partitioning part.

49. The non-transitory computer readable storage medium of any of clauses 36 to 48, wherein the method further includes:

in response to a determination that applying the LIC process to a target GPM partitioning part of the two GPM partitioning parts:

determining LIC parameters for the target GPM partitioning part; and storing, for the current block, the LIC parameters of target GPM partitioning part; or in response to a determination that applying the LIC process to both of the two GPM partitioning parts:

determining LIC parameters for one of the two GPM partitioning parts; and storing, for the current block, the LIC parameters of the one of the two GPM partitioning parts.

50. The non-transitory computer readable storage medium of any of clauses 36 to 49, wherein the current block is a GPM intra inter mode coded block.

51. The non-transitory computer readable storage medium of any of clauses 35 to 50, wherein the current picture is coded with an angular weighted prediction (AWP) mode.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, the method comprising:

receiving a bitstream; and decoding, using coded information of the bitstream, one or more pictures, wherein the decoding comprises:

determining whether a current block of a current picture is coded by partitioning into two geometric partitioning mode (GPM) partitioning parts;

in response to the current block being partitioned into two GMP partitioning parts, determining whether to apply a local illumination compensation (LIC) process to a target GPM partitioning part of the two GPM partitioning parts based on whether a causally neighboring block of the current block applies the LIC process; and in response to a determination that applying the LIC process to the target GPM partitioning part, deriving LIC parameters from the causally neighboring block.

2. The method of claim 1, wherein the causally neighboring block is a block corresponding to a merge index of the target GPM partitioning part.

3. The method of claim 1, wherein the decoding further comprises:

storing, for a subblock comprising the target GPM partitioning part, the LIC parameters of the target GPM partitioning part.

4. The method of claim 1, wherein the target GPM partitioning part is uni-predicted or bi-predicted.

5. The method of claim 1, wherein the decoding further comprises:

in response to a determination that applying the LIC process to the target GPM partitioning part and the target GPM partitioning part being bi-predicted, skipping decoder-side motion vector refinement (DMVR) or bi-directional optical flow (BDOF) towards the target GPM partitioning part.

6. The method of claim 1, wherein the decoding further comprises:

inheriting a LIC flag from the causally neighboring block for GPM Template Matching (TM) or GPM split mode reorder towards the target GPM partitioning part.

7. The method of claim 1, wherein the current block is a GPM intra inter mode coded block.

8. The method of claim 1, wherein the current picture is coded with an angular weighted prediction (AWP) mode.

9. A method of encoding a video sequence into a bitstream, the method comprising:

receiving a video sequence;

encoding one or more pictures of the video sequence; and generating a bitstream, wherein the encoding comprises:

determining whether a current block of a current picture is coded by partitioning into two geometric partitioning mode (GPM) partitioning parts;

in response to the current block being partitioned into two GMP partitioning parts, determining whether to apply a local illumination compensation (LIC) process to a target GPM partitioning part of the two GPM partitioning parts based on whether a causally neighboring block of the current block applies the LIC process; and in response to a determination that applying the LIC process to the target GPM partitioning part, deriving LIC parameters from the causally neighboring block.

10. A method for signaling a bitstream, the method comprising:

receiving a video sequence;

encoding the video sequence by:

determining whether a current block of a current picture is coded by partitioning into two geometric partitioning mode (GPM) partitioning parts;

in response to the current block being partitioned into two GPM partitioning parts, determining whether to apply a local illumination compensation (LIC) process to a target GPM partitioning part of the two GPM partitioning parts based on whether a causally neighboring block of the current block applies the LIC process; and in response to a determination that applying the LIC process to the target GPM partitioning part, deriving LIC parameters from the causally neighboring block;

signaling a bitstream that is generated based on the encoding.

11. The method of claim 9, wherein the causally neighboring block is a block corresponding to a merge index of the target GPM partitioning part.

12. The method of claim 9, wherein the target GPM partitioning part is uni-predicted or bi-predicted.

13. The method of claim 9, wherein the encoding further comprises:

inheriting a LIC flag from the causally neighboring block for GPM Template Matching (TM) or GPM split mode reorder towards the target GPM partitioning part.

14. The method of claim 9, wherein the current block is a GPM intra inter mode coded block.

15. The method of claim 9, wherein the encoding further comprises:

storing, for a subblock comprising the target GPM partitioning part, the LIC parameters of the target GPM partitioning part.

16. The method of claim 10, wherein the causally neighboring block is a block corresponding to a merge index of the target GPM partitioning part.

17. The method of claim 10, wherein the target GPM partitioning part is uni-predicted or bi-predicted.

18. The method of claim 10, wherein the encoding further comprises:

inheriting a LIC flag from the causally neighboring block for GPM Template Matching (TM) or GPM split mode reorder towards the target GPM partitioning part.

19. The method of claim 10, wherein the current block is a GPM intra inter mode coded block.

20. The method of claim 10, wherein the encoding further comprises:

storing, for a subblock comprising the target GPM partitioning part, the LIC parameters of the target GPM partitioning part.

* * * * *